Patented Mar. 28, 1939

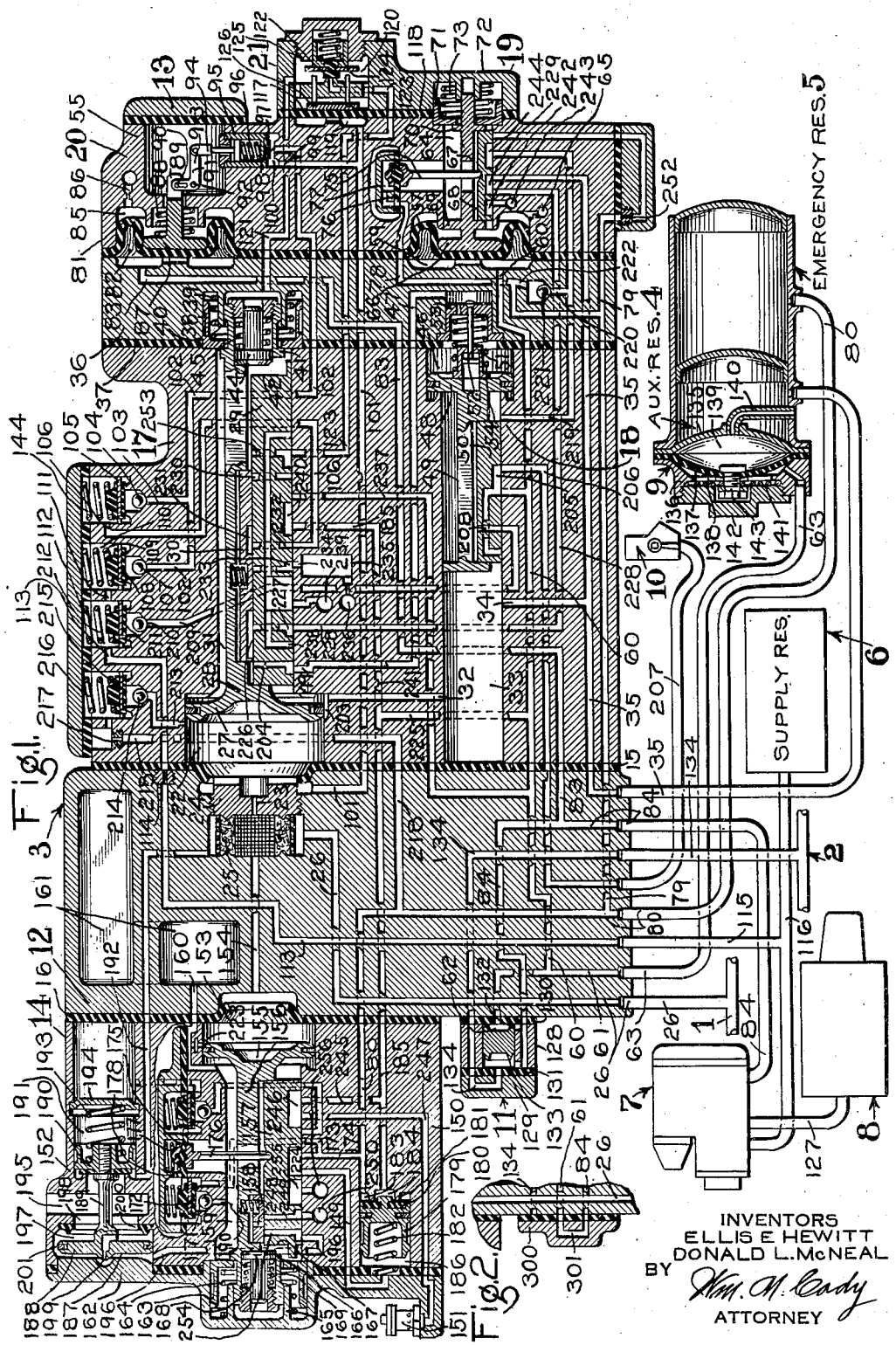

2,152,257

UNITED STATES PATENT OFFICE 2,152,257

BRAKE MECHANISM

Ellis E. Hewitt, Edgewood, and Donald L. McNeal, Wilkinsburg, Pa., assignors to The Westinghouse Air Brake Company, Wilmerding, Pa., a corporation of Pennsylvania Application August 24, 1937, Serial No. 160,562

93 Claims. (Cl. 303—26)

This invention relates to brake equipments and more particularly to brake equipment for railway rolling stock to be employed in high speed train service.

Modern transportation conditions require that railway trains be operated at relatively high speeds. In high speed train service, it is imperative that the brake equipment on the several vehicles of the train operate with a high degree of reliability and flexibility of control, so that train may be easily handled with the utmost regard for safety. The principal object of the invention is to provide an improved vehicle brake equipment having brake controlling characteristics which render it particularly adaptable for use in vehicles to be operated at high speeds.

Another object of the invention is to provide an improved vehicle brake equipment embodying means whereby the brakes may be controlled either by straight air operation or by automatic operation and whereby a combined automatic and straight air emergency application of the brakes may be effected through the operation of the straight air control means. The advantage of this arrangement is that if either of these brake controlling means should for any reason fail to provide the desired control of the brakes the other may be employed thus rendering the equipment more reliable than would otherwise be the case.

Another object of the invention is to provide an improved vehicle brake equipment embodying means whereby the brakes may be controlled either by straight air operation or automatic operation and in which the means for controlling the automatic operations may be controlled by the use of usual type of automatic brake valve device employed on locomotives, and which will function in harmony with the usual type of universal valve devices employed in passenger equipment cars. The advantage of such an arrangement is that the equipment may be employed equally as well in a train in which the combined automatic and straight air control of the brakes is employed as in a train in which only the automatic control is employed.

In some types of combined automatic and straight air brake equipments heretofore employed it has been discovered that when a straight air application of the brakes is being effected the automatic portion of the equipment has a tendency to move to application position and when such movement occurs an undesired automatic application of the brakes is effected. It is therefore a further object of the invention to provide an improved combined automatic and straight air brake equipment in which the automatic portion thereof is stabilized against unintentional movement to application position when a straight air application of the brakes is being effected or at any other time.

In combined automatic and straight air brake equipments it is the usual practice to employ a double check valve device for controlling communication between the straight air pipe and the brake application and release pipe or passage and for also controlling communication from the supply passage of the automatic portion of the equipment and said application and release pipe or passage. When a straight air application of the brakes is being effected the double check valve of the device functions to isolate the automatic portion from the application and release pipe, however there is a possibility of leakage of fluid under pressure from the application passage past the seated check valve to the supply passage and any chambers connected therewith. In equipment heretofore employed there was no way for fluid leaking into the supply passage to escape, so that the pressure of fluid in the passage and chambers in communication therewith was increased according to the rate of leakage and duration of the application of the brakes. Now when in releasing the straight air brake application, the pressure of the straight air pipe has been reduced to slightly below the pressure unintentionally built up in the supply pipe the check valve will be caused to move from its proper position to a position to cut off the further release of fluid under pressure from the application and release pipe, with the result that the brakes will be maintained applied with a brake cylinder pressure substantially equal to the pressure of fluid in the supply pipe. This is very objectionable in that the operator has no way of knowing that some of the brakes may be thus maintained applied, so that while the train is in motion the usual brake shoes will drag on the wheels and cause unnecessary wear and heating of both the shoes and the wheels, but more serious damage is done when the retained brake application is such that the wheels are caused to slide on the track rails causing flat spots to be worn on the wheels. The time when this is most likely to occur is when the train is put in motion after having been brought to a stop. It is therefore another object of the invention to provide a combined automatic and straight air brake equipment in which an unintentional automatic application of the brakes is prevented when a straight air application is being released. This object is attained by maintaining the supply passage of the automatic portion of the equipment vented to the atmosphere during the straight air control of the brakes.

A further object of the invention is to provide a combined automatic and straight air brake equipment with a combined cut-off and quick service limiting valve device which is operative when either an automatic or straight air application of the brakes is being effected for closing the quick service communications from the brake pipe to the automatic brake controlling valve device and to also close communication from the brake pipe to a supply reservoir from which fluid under pressure is supplied to effect an application of the brakes and for maintaining these communications closed until, in releasing the brakes, the fluid previously supplied from the supply reservoir has been reduced to a predetermined low degree.

Other objects and advantages will appear in the following more detailed description of the invention.

In the accompanying drawing Fig. 1 is a diagrammatic view, mainly in section, of a fluid pressure brake equipment embodying the invention and Fig. 2 is a fragmentary sectional view illustrating the manner of converting the equipment for automatic control only.

As shown in the drawing the equipment may comprise a brake pipe 1, a straight air pipe 2, a brake controlling valve device 3, an auxiliary reservoir 4, an emergency reservoir 5, a supply reservoir 6, a relay valve device 7, a brake cylinder 8, a displacement volume device 9, a retaining valve device 10 and a double check valve device 11.

The brake controlling valve device 3 may comprise a pipe bracket 12, an equalizing or triple valve portion 13 which is clamped to one side of the bracket and an emergency portion 14 which is clamped to the other side of the bracket, there being a gasket 15 interposed between the casing of the triple valve portion and the bracket and a gasket 16 interposed between the casing of the emergency portion and the bracket.

The equalizing or triple valve portion 13 may comprise an equalizing or triple valve device 17, a relay release valve device 18, a release interlock valve device 19, a combined cut-off and quick service limiting or modifying valve device 20 and a release insuring valve device 21.

The equalizing valve device 17 may comprise a casing having a piston chamber 22 which is connected to the brake pipe 1 by way of a restricted passage 23 in a strainer retaining nut 24 having screw-threaded connection with the pipe bracket, a strainer device 25 which is secured to the pipe bracket by the nut 24, and a passage and pipe 26. The chamber 22 contains a piston 27 having a stem 28 adapted to operate a main slide valve 29 and an auxiliary slide valve 30 contained in a valve chamber 31 which is connected to the auxiliary reservoir 4 by way of a passage 32, valve chamber 33 of the release relay valve device 18, a passage 34 and a passage and pipe 35.

As shown in the drawing, the valve chamber 31 is closed at one end by recessed casing section 36 which is clamped to the main casing section, there being a gasket 37 interposed between these casing sections. The recess in the casing section 36 is of greater diameter than that of the major portion of the chamber, and due to this, the rear end of the main casing section serves as a stop shoulder for limiting inward movement of a stop member 38 which is slidably mounted in the casing section 36. Interposed between and engaging the stop member 38 and the casing section 36 is a spring 39 which, at all times, tends to move the member in the direction toward the stop shoulder. With the several parts of the equalizing valve device in release position as shown the spring 39 acts to maintain the stop member 38 in engagement with the stop shoulder.

The rear end portion of the piston stem 28 extends through a central opening in the stop member 38 and is slidably guided by an annular lug 40, preferably formed integral with the casing section 36. The piston stem, at a point located a short distance inwardly from its rear end, is provided with a collar or lug 41, one side of which is adapted to be engaged by the stop member 38 and the other side of which is adapted to engage a rear end surface 42 of the main slide valve 29.

The rear end portion of the piston stem 28 is provided with a stabilizing mechanism which is for the purpose of stabilizing the action of the several parts of the equalizing valve device against unintentional movement to initial quick service position due to unavoidable fluctuations in brake pipe pressure but which will yield a predetermined reduction in brake pipe pressure in initiating an application of the brakes. This stabilizing mechanism is of substantially the same construction and functions in the same manner as the corresponding mechanism fully disclosed and broadly claimed in a patent to Clyde C. Farmer, No. 2,031,213, issued February 18, 1936 and for this reason need only be briefly described here as comprising a plunger 44 which is slidably mounted in the piston stem to move longitudinally and is subject to the pressure of a spring 45, and which is adapted to cooperate with the main slide valve to prevent accidental movement of the stem and auxiliary slide valve to initial quick service position. As shown the piston stem normally maintains the forward end of the plunger out of engagement with the main slide valve. The relay release valve device 18 may comprise a casing which, in the present embodiment of the invention, is integral with the casing of the equalizing valve device 17. Provided in the casing is a piston chamber 46 which is connected to a passage 47 leading to the seat for the equalizing main slide valve 29 and which contains a piston 48 having a stem 49 adapted to operate a slide valve 50 contained in valve chamber 33, which chamber 33 is in constant open communication with the equalizing valve chamber 31 by way of passage 32 and in constant open communication with the auxiliary reservoir by way of passage 34 and passage and pipe 35. Also contained in the piston chamber 46 is a plunger 51 which is slidably mounted on a guide member 52 secured to a spring seat 53 secured to the casing, which plunger is at all times held in engagement with the face of the piston by the action of a spring 54 interposed between and engaging the plunger and spring seat.

The release interlock valve device 19 is provided for the purpose of controlling the operation of the release relay valve device in graduating the release of the brakes following an automatic application of the brakes and also for the purpose of preventing operation of the relay valve device from its normal release position when in effecting a straight air application of the brakes the equalizing piston 27 and auxiliary slide valve 30 move from their normal release position toward service position, all of which will hereinafter more fully appear.

This valve device 19 may comprise a casing which is integral with a cap member 55 and which is clamped to the filler member 36, there being a gasket 56 interposed between the adjacent clamping faces of the filler member and the cap member. The valve device also comprises a movable abutment which, in the present embodiment of the invention, is in the form of a flexible diaphragm 57 which, as shown, may be made integral with the gasket 56. At one side of the flexible diaphragm 57 is a chamber 59 which is in constant open communication with a passage 60 leading to a supply and release passage 61, which, as will hereinafter more fully appear, leads from a valve chamber 62 of the check valve device 11 to a pipe 63 connected to the displacement chamber 9. At the other side of the diaphragm is a chamber 64 which is constantly connected through a restricted passage 65 to the atmosphere. Contained in chamber 64 and slidably guided by the casing is a follower 66 which is in operative engagement with the diaphragm and which is provided with a stem 67 adapted to operate a slide valve 68 also contained in chamber 64, said slide valve being interposed between and engaged by spaced operating collars 69 and 70 carried by the stem. The rear face of the collar 70 engages with a stop member 71 which is slidably mounted in the cap member 55 and an auxiliary cap member 72 clamped to the cap member, which stop member is subject to the action of a spring 73 interposed between and engaging the cap member 72 and stop member. Movement of the stop member 71 in the direction toward the diaphragm is limited, as shown, by an annular stop shoulder formed on the cap member 55.

When the equipment is charged with fluid under pressure the underside or face of the interlock slide valve is subject to the pressure of fluid from both the auxiliary and main reservoirs and in order to prevent such pressure from raising the valve from its seat a loading mechanism is provided which comprises a strut 75 having its lower end in thrust engagement with the back of the slide valve 68. The upper end of the strut is operatively engaged by a flexible diaphragm 76 having at one side a chamber 77 which is connected through a passage 78, a passage 79 and a passage and pipe 80 to the emergency reservoir 5. The diaphragm 76, under the influence of the pressure of fluid admitted to the chamber 77, acts through the medium of the strut 75 to maintain the slide valve 68 in close contact with its seat against the opposing fluid pressure acting on the underside thereof, thus preventing the loss of fluid under pressure from both the auxiliary and main reservoirs by way of valve chamber 64 and the restricted atmospheric passage 65.

The combined cut-off and quick service limiting or modifying valve device 20 is provided for three purposes; first, for cutting off the final quick service flow of fluid from the brake pipe when, in effecting an application of the brakes, the pressure of fluid in the piston chamber of the relay valve device 7, which is the same as brake cylinder pressure, has been increased to about fourteen pounds; and secondly, to maintain the initial quick service venting communication closed when a release of the brakes is being effected; and thirdly, to maintain communication between the brake pipe and the supply reservoir closed as long as the pressure in the relay piston chamber is higher than the setting of the valve device.

This valve device 20 may comprise a casing which in the present embodiment of the invention is integral with the cap member 55 and also comprises a movable abutment which may be in the form of a flexible diaphragm 81 and which, as shown, may be formed integral with the gasket 56. At one side of the diaphragm is a chamber 82 which is connected to the piston chamber of the relay valve device 7 by way of a passage 83 and a passage and pipe 84. At the other side of the diaphragm is a chamber 85 which is connected through a restricted passage 86 to the atmosphere. Contained in the chamber 85 is a movable follower 87 which is operatively engaged on one side by the diaphragm 81 and on the other side by a spring 88 which is seated on the casing. This follower is provided with a stem 89 which, at its end, is pivotally connected to the arm 90 of a bell-crank lever 91 rockably mounted on a pin 92 carried by the casing, the other arm 93, being pivotally connected to the stem 94 of the hollow cut-off valve piston 95 of the device. The stem 94 is slidably mounted in the valve piston to permit a slight movement relative to the valve piston and engages one end of a spring 96 which is contained in and seats on the valve piston and through the medium of which the stem is adapted to act to move the valve piston. The valve piston is provided with a valve 97 which is adapted to engage an annular seat rib 98 carried by the casing, to cut off communication from a chamber 100 to a passage 102. The chamber 100 is connected to a passage 99 leading from a restricted passage 101 which is connected to the equalizing piston chamber 22 and consequently to the brake pipe, and the passage 102 has a branch passage 103 which is connected to a passage 106 leading to the seat for the equalizing main slide valve 29, there being interposed in the communication between the passages 103 and 106 a ball check valve 104 and a disk check valve 105 which is arranged in series with the ball check valve 104 and which is subject to the pressure of a light coil spring 144. The passage 102 besides being connected as just described is also connected to the supply reservoir 6 by way of a ball check valve 107, a disk check valve 108 which is arranged in series with the valve 107 and which is subject to the pressure of a spring 109 having a value of around five pounds, spring chamber 110, a short passage 111, a spring chamber 112, a passage 113 in which there is interposed a choke plug 114 and connected pipes 115 and 116. From the foregoing description it will be seen that the valve 97 is operative to control communication from the brake pipe to both the equalizing valve device and supply reservoir.

The release insuring valve device 21 is provided for the purpose of venting fluid under pressure from the equalizing valve chamber 31 and auxiliary reservoir 4 to the atmosphere when the brake pipe pressure exceeds auxiliary reservoir pressure by approximately one and one half pounds, thus facilitating the release of the brakes on cars where the operating parts of the equalizing valve device, due to excessive friction, do not promptly move to release position in response to a slightly lower fluid pressure differential. This release insuring valve device is of substantially the same construction and functions in the same manner as the corresponding mechanism fully disclosed in the hereinbefore mentioned Farmer Patent No. 2,031,213 and for this reason will here be only briefly described as comprising a casing which, in the present embodiment of the invention, is integral with the auxiliary cap member 72 and also comprises a flexible diaphragm 117 which may be formed integral with a gasket 118 interposed between the cap members 55 and 72. At one side of this diaphragm is a chamber 119 which is connected to the restricted brake pipe passage 101 and at the other side is a valve chamber 120 which is constantly connected through a passage 121 to the equalizing slide valve chamber 31. Contained in chamber 120 is a vent valve 122 which controls communication from this chamber to a vent passage 123 which leads to the seat for the equalizing main slide valve 29. This valve is normally maintained seated on an annular seat rib carried by the casing by the action of a spring 124 interposed between and operatively engaging the valve and a cap nut 125 which has screw-threaded connection with the cap member 72. Also contained in the valve chamber 120 is a follower member 126 which is movable by the flexible diaphragm 117 to control the operation of the vent valve 122.

The relay valve device 7 is provided for that purpose of supplying fluid under pressure from the supply reservoir 6 to the brake cylinder 8 to effect an application of the brakes and also for the purpose of venting fluid under pressure from the brake cylinder to effect a release of the brakes, and is adapted to be controlled either by the straight air portion of the equipment or by the automatic portion.

This relay valve device may be of substantially the same construction as the relay valve device disclosed and claimed in United States Letters Patent No. 2,096,491 to Ellis E. Hewitt, issued October 19, 1937 and for this reason a detailed description of the device in the present application is deemed unnecessary. It should here be mentioned that with the several parts of the equipment in release position the relay valve device connects the brake cylinder 8 to atmosphere and that when in effecting an application of the brakes fluid under pressure is supplied through pipe 84 to the piston chamber of the relay valve device, the device functions to first close the atmospheric communication from the brake cylinder and to then supply fluid under pressure from pipe 116 and thereby from the supply reservoir 6 to the brake cylinder by way of the brake cylinder pipe 127. When, in effecting a release of the brakes, fluid under pressure is vented from the pipe 84 and consequently from the relay piston chamber, the device functions to vent fluid under pressure from the pipe 127 and brake cylinder to the atmosphere.

The double check valve device 11 is for the purpose of conditioning the equipment for either straight air or automatic operation and is automatically operative to its proper conditioning position when fluid under pressure is supplied thereto in initiating an application of the brakes. This device may comprise a casing 128 which is clamped to one side of the pipe bracket 12 and may also comprise a cap 129 which is secured to the casing in any desired manner. Interposed between the casing and the pipe bracket is a gasket 130 and between the cap and casing is a similar gasket 131. Slidably mounted in the casing 128 is a valve member having a valve 132 at one end adapted to engage the gasket 131 to close communication from the passage 61 to the passage 84 leading to the piston chamber of the relay valve device 7. At the other end the valve member is provided with a valve 133 which is adapted to engage the gasket 131 to close communication between a passage and pipe 134, leading from the straight air pipe 2, and the passage 84.

The displacement volume device 9 is provided for the purpose of adding volume to the piston chamber of the relay valve device to control the operation of the relay valve device to provide the proper build up of brake cylinder pressure in substantially the same manner as this control has been effected by the use of the well known dummy brake cylinder. This device may be of substantially the same construction as the corresponding device shown, described and claimed in an application of Ellis E. Hewitt, Serial No. 156,693, filed July 31, 1937 and for this reason need only be described briefly as comprising casing sections 135 and 136 which may be secured to the shell of the combined auxiliary and emergency reservoirs as shown, the casing section 135 forming one of the heads of the auxiliary reservoir. Clamped between these casing sections is a movable abutment in the form of a flexible diaphragm 137. At one side of the diaphragm is a chamber 138 which is in constant open communication with the pipe 63, and at the other side is a chamber 139 which is isolated from the interior of the auxiliary reservoir and connected to the atmosphere through the medium of a pipe 140. The diaphragm is normally held in the position in which it is shown by the action of a coil spring 141 having one end secured to the casing section 136 by means of a cap nut 142 which has screw-threaded connection with the casing section and the opposite end secured to a bolt 143 carried by the diaphragm.

The emergency portion 14 may comprise an emergency valve device 150, a safety valve device 151 and a quick action vent valve device 152.

The emergency valve device 150 may comprise a casing having a piston chamber 153 which is connected to the brake pipe by way of a passage 154, strainer device 25 and passage and pipe 26. The chamber 153 contains a piston 155 having a stem 156 adapted to operate a main slide valve 157 and an auxiliary slide valve 158 contained in a valve chamber 159 which is connected through a passage 160 to a quick action chamber 161 formed in the pipe bracket 12.

As shown the valve chamber 159 is closed by a recessed cap 162 which is clamped to the main casing section. The recess in the cap is of greater diameter than the adjacent end of the valve chamber, so that the rear end of the main casing section serves as a stop shoulder for limiting inward movement of a stop member 163 which is slidably mounted in the casing section. Interposed between and engaging the stop member and the cap 162 is a spring 164 which, at all times, tends to move the member in the direction of the stop shoulder. With the several parts of the emergency valve device in normal release position as shown, the spring 164 acts to maintain the stop member in engagement with the stop shoulder.

The rear end portion of the piston stem 156 extends through a central opening in the stop member 163 and is slidably guided by an annular lug 165, preferably formed integral with the cap 162. The piston stem, at a point located a short distance inwardly from its rear end, is provided with a collar or lug 166, one side of which is adapted to be engaged by the stop member 163 and the other side of which is adapted to engage a rear end surface 167 of the emergency main slide valve 157.

The rear end portion of the piston stem 156 is provided with a stabilizing mechanism which is for the purpose of stabilizing the action of the several parts of the equalizing valve device against unintentional movement to emergency position and for the purpose of assisting in moving the emergency piston out of sealing engagement with the gasket 16 in initiating the release of the brakes following an emergency application. This stabilizing mechanism is of substantially the same construction and functions in substantially the same manner as the corresponding device fully disclosed and claimed in the aforementioned Clyde C. Farmer Patent No. 2,031,213 and in view of this the mechanism may be briefly described as comprising a plunger 168 which is slidably mounted in the piston stem to move longitudinally, and is subject to the pressure of a spring 169, and which is adapted to cooperate with the main slide valve 157 to prevent the accidental movement of the stem and auxiliary slide valve 158 to emergency position and to move the emergency piston 155 out of sealing engagement with the gasket 16 upon the initiation of the release of the brakes following an emergency application.

The slide valve chamber 159 of the emergency valve device is connected to the emergency reservoir by way of a passage 170, check valves 171 and 172 arranged in series, a passage 173, a passage 174 and a passage and pipe 80. This communication is provided for the purpose of permitting fluid under pressure to flow from the quick action chamber to the emergency reservoir when for any reason the quick action chamber is charged at a rate faster than that at which the emergency reservoir is being charged, thus preventing the quick action chamber from becoming overcharged.

For the purpose of preventing fluid under pressure, acting on the face of the main slide valve 157 of the emergency valve device from raising the valve from its seat when the pressure of fluid in the valve chamber 159 is reduced, a loading mechanism is provided. This mechanism as shown may comprise a flexible diaphragm 175 which is mounted in the casing of the emergency valve device and which operatively engages a strut or rocking pin 176 through the medium of which a loading force is adapted to be transmitted from the diaphragm to the valve. The slide valve chamber 159 is open to the underside of the diaphragm and at the other side of the diaphragm there is a chamber 177 to which the valve chamber 50 is adapted to be connected by way of passages 80, 174, 173 and a restricted passage 178. It will thus be seen that the diaphragm is normally subjected to emergency reservoir pressure on one side, which is balanced by a corresponding fluid pressure in chamber 159 so that the diaphragm does not act to exert downward pressure on the main slide valve, however, when the pressure of fluid in chamber 159 is reduced in effecting an application of the brakes the diaphragm acts to exert pressure on the valve.

The emergency valve device also comprises a high pressure valve device which is operative in effecting an automatic emergency application of the brakes to connect the emergency reservoir 5 to the piston chamber of the relay valve device 7. This device may comprise a valve piston 179 having a valve 180 which is adapted to be normally maintained in sealing engagement with an annular seat rib 181 by the action of a coil spring 182. Surrounding the seat rib is a chamber 183 to which a portion of the face of the valve piston is exposed, the remaining portion of the face, i. e., that portion within the seat rib, being exposed to a chamber 184 which is connected to a passage 185 which, as will hereinafter more fully appear, is normally connected to the atmosphere. At the other or spring side of the valve piston is a chamber 186 which is connected to a passage 149 leading to the seat for the emergency main slide valve.

The safety valve device 151 is associated with the emergency valve device and is provided for the purpose of limiting the pressure of fluid obtainable in the piston chamber of the relay valve device 7 and consequently in the brake cylinder to around sixty pounds when an automatic service application of the brakes is effected. This device is of the usual well known construction and for this reason a detailed description thereof is deemed unnecessary.

The quick action vent valve device 152 is for the purpose of locally venting fluid under pressure from the brake pipe to the atmosphere at a rapid rate to propagate quick action throughout the length of a train when an emergency application is initiated and is of substantially the same construction as the corresponding device fully disclosed in the aforementioned Clyde C. Farmer Patent No. 2,031,213. Briefly described this device may comprise a casing which in the present embodiment of the invention is integral with the casing of the emergency valve device and which is provided with a piston chamber 187 containing a piston 188 having a stem 189 adapted to control the operation of a poppet type of vent valve 190 contained in a valve chamber 191 which is connected through a passage 192 and strainer device 25 to the brake pipe passage 26. Also contained in chamber 191 is a spring 193 which is interposed between and engages the valve 190 and a spring seat 194 removably carried by the casing. The vent valve is normally maintained seated by the action of the spring 193 so as to close communication from the valve chamber 191 to a passage 195 which is constantly connected to the atmosphere. The piston chamber 187 at one side of the piston is connected to a passage 196 leading to the seat for the emergency main slide valve 157. At the other side of the piston there is a chamber 197 which is normally connected through a passage 198 to the atmospheric passage 195. The piston is provided with a restricted port 199 which connects the piston chamber to the chamber 197 and which is for the purpose of controlling the rate of flow of fluid from the quick action chamber to the atmosphere when in effecting an emergency application of the brakes the quick action piston is moved into sealing engagement with an annular gasket 200 carried by the casing. Extending around the quick action piston is a leakage groove 201 which, when the piston is in its normal position as shown, permits fluid under pressure which may leak from the quick action valve chamber 159 to the piston chamber 187 to flow to the atmosphere thereby preventing a build up of pressure in the piston chamber if the rate of leakage of fluid to the piston chamber should be faster than that at which it could escape through the restricted port 199, thus insuring against accidental movement of the piston to unseat the vent valve.

The retaining valve device 10 may be of the usual construction and is provided for the purpose of controlling the rate of reduction in the piston chamber of the relay valve device 7 in effecting a release of the brakes and in cycling the brakes to retain a predetermined pressure in said piston chamber during the time required for recharging the equipment when descending heavy grades under the control of the automatic brake apparatus. Since the details and operation of this device are well known further description thereof is deemed unnecessary.

*Initial charging*

To charge the equipment the operator, through the medium of a suitable brake valve mechanism, causes fluid under pressure to be supplied to the brake pipe 1 and also causes the straight air pipe 2 to be connected to the atmosphere.

Fluid under pressure supplied to the brake pipe flows through pipe and passage 26 and strainer device 25 to the equalizing piston chamber 22 by way of the restricted passage 23, and to the emergency piston chamber by way of passage 154.

Fluid under pressure flows from the equalizing piston chamber 22 through a feed groove 203 to the equalizing slide valve chamber 31 and from thence flows through passage 32 to valve chamber 33 of the relay release valve device, and also flows through a port 204 in the equalizing main slide valve 29 and passage 47 to the relay release piston chamber 46. From this it will be seen that the fluid pressures acting on opposite sides of the relay release piston 48 will be substantially equal to each other, and that by reason of this, the spring 54, acting through the medium of the plunger 51, maintains the piston and thereby the release relay slide valve 50 in release position as shown in the drawing. With the slide valve 50 in this position the chamber 138 of the displacement volume device 9 is connected to the atmosphere by way of pipe 63, passage 61, passage 60, a cavity 205 in the slide valve 50, a restricted passage 206, a pipe 207 and the communication through the retaining valve device 10. The chamber 62 of the double check valve device 11 is connected to the passage 61 so that it is also connected to the atmosphere. If the check valve member of double check valve device should be in its extreme left hand position instead of in the position in which it is shown in the drawing the valve 132 establishes communication between the chamber 62 and the passage 84 leading to the piston chamber of the relay valve device, so that this piston chamber would be connected to atmosphere. However, with the valve member in its extreme right hand position as shown, the valve 132 is seated and the valve 133 unseated, so that the relay piston chamber is connected to the straight air pipe which as before mentioned is connected to the atmosphere.

With the piston chamber of the relay valve device 7 connected to the atmosphere through either of the two circuits just traced, the device establishes communication from the brake cylinder 8 to the atmosphere in the usual manner.

The passage 60 is connected to the diaphragm chamber 59 of the relay interlock valve device 19 and since this passage is connected to the atmosphere in the manner just described, the chamber 59 will be at atmospheric pressure. The valve chamber 64 on the other side of the diaphragm is at atmospheric pressure due to its communication with the atmosphere through passage 65. Since both of these chambers are at atmospheric pressure, the spring 73, acting through the medium of the follower stem 67, maintains the valve 68, follower 66 and flexible diaphragm 57 in their extreme position toward the left hand as shown in the drawing.

With the check valve member of the device 11 in the position shown the diaphragm chamber 82 of the combined cut-off and quick service limiting valve device is connected to the straight air pipe 2 which is in communication with the atmosphere so that the chamber will be at atmospheric pressure. As a result the spring 88 acts to maintain the follower 87, diaphragm 81, and bell crank lever in the position to maintain the valve 97 unseated as shown.

From the valve chamber 33 of the relay release valve device 18 fluid under pressure flows through passage 34 and passage and pipe 35 to the auxiliary reservoir 4. Fluid under pressure may also flow from the valve chamber 33 to the supply reservoir 6 by way of a port 208 in the relay release slide valve 50, a passage 209, past a ball check valve 210, a disk check valve 211 which is arranged in series with the ball check valve and which is subjected to the seating pressure of a light coil spring 212, passage 113, choke plug 114 and pipes 115 and 116.

If, while charging the equipment, the brake pipe pressure should be increased at such a rate as to create a five pound pressure differential on the check valve 108 which may be the case at the head end of a train where the rise in brake pipe pressure is rapid, fluid under pressure will flow from the equalizing piston chamber 22 and consequently from the brake pipe to the supply reservoir 6 by way of passage 101, passage 99, chamber 100, past the unseated valve 97 of the combined cut-off and quick service limiting valve device 20, passage 102, past the ball check valves 107 and 108, passage 111, check valve spring chamber 112, passage 113 and pipes 115 and 116. When the flow of fluid is from the brake pipe as just described, the check valves 210 and 211 will remain seated and thereby prevent flow of fluid from the chamber 112 to the passage 209 and consequently to the auxiliary reservoir. When the pressure of fluid in the brake pipe reduces, due to the usual equalization toward the rear end of the train, so that it no longer predominates over the pressure of fluid in chamber 110 and the spring 109 by five pounds the check valve 108 will be caused to seat and thus cut off the further flow of fluid from the brake pipe to the supply reservoir. If when the check valve is closed the pressure of fluid in the chamber 112 is below auxiliary reservoir pressure fluid under pressure from the auxiliary reservoir will unseat the check valves 210 and 211 and flow to the supply reservoir thus fully charging the supply reservoir to substantially the same pressure as the auxiliary reservoir. From this it will be seen that the supply reservoirs, particularly at the head end of the train, will be substantially fully charged at a fairly rapid rate from the brake pipe, thus accelerating the rate of the initial charging of the equipment. On a very long train such as employed in freight service the rise in brake pipe pressure at the rear end of the train may be at such a slow rate that the supply reservoir will be charged by way of the auxiliary reservoir instead of by way of passage 102.

Fluid under pressure flows from the equalizing piston chamber 22 to the emergency reservoir 5 by way of a restricted passage 213, a ball check valve 214, a disk check valve 215 which is arranged in series with the ball check valve and which is subject to the pressure of a light coil spring 216, a choke plug 217, a passage 218 and passage and pipe 80. If for any reason the auxiliary reservoir pressure should exceed emergency reservoir pressure, fluid at auxiliary reservoir pressure will flow from the relay release valve chamber 33 through a passage 219, a passage 220, past a ball check valve 221, a passage 222, passage 78, passage 79 and passage and pipe 80 to the emergency reservoir. From this it will be understood that the auxiliary reservoir pressure is adapted to equalize into the emergency reservoir and that in the event of the communication from the equalizing piston chamber to the emergency reservoir becoming clogged, the emergency reservoir will be charged by way of the auxiliary reservoir.

Fluid under pressure supplied to the passage 80 flows therefrom by way of passage 79 and the restricted passage 78 to the strut diaphragm chamber 77 of the relay release interlock valve device 19 causing the diaphragm to act through the medium of the strut 75 to load the interlock slide valve 68.

It should here be mentioned that passages 219, 35 and passage 79 lead to the face side of the interlock slide valve 68 and that fluid under pressure from these passages exerts an upwardly directed force on the slide valve which, due to the valve chamber 64 being at atmospheric pressure, has a tendency to raise the slide valve from its seat. The load imposed upon the slide valve by the pressure of fluid in chamber 77 acting through the medium of the flexible diaphragm 76 and strut 75 will maintain the slide valve in close contact with its seat against the opposing fluid pressure in the above mentioned passages.

Fluid under pressure flows from the equalizing valve chamber 31 to the chamber 120 at one side of the diaphragm 117 of the release insuring valve device 20 by way of passage 121 and at the same time fluid under pressure flows from the equalizing piston chamber 22 and consequently from the brake pipe to the chamber 119 at the other side of the diaphragm by way of passage 101. With the equipment charged the pressure of fluid in these chambers will be substantially equal so that the spring 124 maintains the valve 122 seated, thus closing communication from the diaphragm chamber 120 to the exhaust passage 123.

Fluid under pressure from the brake pipe also flows to the valve chamber 191 of the quick action vent valve device 152 by way of the strainer device 25 and passage 192.

With the quick action piston chamber 187 connected to atmosphere by way of the restricted port 199 in the quick action piston and the leakage groove 201 the spring 193 acts to maintain the vent valve 190 seated so that there can be no flow of brake pipe fluid to the atmosphere by way of the vent valve chamber until such time as an emergency application of the brakes is initiated.

Fluid under pressure flowing from the brake pipe through the strainer device flows through passage 154 to the emergency piston chamber 153 and from thence flows through a restricted passage 223 and the passage 160 to both the quick action chamber 161 and emergency valve chamber 159. Fluid under pressure is free to flow from the emergency slide valve chamber 159 through passage 190, past the check valves 171 and 172 and through passages 173, 174 and 80 to the emergency reservoir if for any reason the quick action chamber should have a tendency to increase above emergency reservoir pressure, thus effectively preventing an overcharge of the quick action chamber.

From the passage 80 which is connected to the emergency reservoir, fluid under pressure flows to the chamber 181 at one side of the valve piston 179 of the high pressure valve device 150 and to the passage 174. With the several parts of the emergency valve device in their normal release position fluid under pressure flows from passage 174 to the chamber 186 at the other side of the valve piston by way of a cavity 224 in the emergency main slide valve 157 and passage 149. With the chamber 186 thus charged the spring 182 acts to maintain the valve 180 seated on the seat rib 181 so as to prevent the flow of fluid from chamber 183 and consequently the emergency reservoir by way of passage 185 which is connected to the atmosphere by way of a branch passage 225, passage 60, cavity 205 in the relay release slide valve 50, passage 206, pipe 207 and retaining valve device 10.

From the foregoing description it will be understood that the equipment is fully charged with fluid under pressure and that the several parts thereof are in their release position. As shown in the drawing the check valve member of the double check valve device is in the position to condition the equipment for straight air control.

For the purpose of this description the equipment will be considered fully charged when it carries one hundred fifteen pounds but it will be understood that it may be fully charged at a higher or a lower pressure depending upon the braking requirements of different railroads or of different classes of train service.

*Automatic service application of the brakes*

An automatic service application of the brakes is initiated by effecting a gradual reduction in brake pipe pressure by the use of any desired brake valve mechanism. Since, as before described, the brake pipe 1 is in communication with the equalizing piston chamber 22 and with the emergency piston chamber 153, the pressure of fluid in these chambers gradually reduces with the brake pipe pressure.

Upon a predetermined, but light reduction in the pressure of fluid in the equalizing piston chamber 22, the pressure of fluid in the equalizing slide valve chamber 31 causes the equalizing piston 27 to move outwardly in a direction toward the left hand, and through the medium of the piston stem 28, shifts the auxiliary slide valve 30 relative to the main slide valve 29. The piston as it is thus being moved cuts off communication from the equalizing piston chamber 22 to the passage 213 and also closes the feed groove 203 so as to prevent back flow of fluid under pressure from the valve chamber 31 to the piston chamber. As the feed groove 203 and passage 213 are thus being closed a cavity 226 in the auxiliary slide valve is moved into connecting relationship with the port 204 in the main slide valve and a port 227 also in the main slide valve. The port 204, with the several parts of the equalizing valve device in release position, is in direct communication with the equalizing slide valve chamber 31, but when the auxiliary slide valve is moved relative to the main slide valve this direct communication is cut-off and this port and consequently the registering passage 47 and relay release piston chamber 46 is connected to the relay release slide valve chamber 33 by way of cavity 226, port 227, a passage 228, a cavity 229 in the slide valve 68 of the relay release interlock valve device, and passages 35 and 34.

After the feed groove 203 is closed, the continued movement of the equalizing piston 27 causes the rear end of the auxiliary slide valve 30 to uncover a service port 230 in the main slide valve to the slide valve chamber 31, following which, the plunger 44, mounted in the rear end of the piston stem 28 engages the rear surface 42 of the main slide valve. The further outward movement of the auxiliary slide valve by the piston 27 and relative to the main slide valve is now resisted by the spring 45 acting through the medium of the piston stem 28. Now when the predetermined light reduction in brake pipe pressure has been effected, say for instance about one pound, a sufficient fluid pressure differential is created on the piston 27 to cause the piston to move outwardly against the resistance offered by the spring 45, the piston as it thus moves shifting the auxiliary slide valve to initial quick service position. The piston 27 is very sensitive to pressure differentials and, therefore, quickly responds to a light but predetermined reduction in brake pipe pressure to connect the release relay valve chamber 33 to the release relay piston chamber 46, to close the feed groove 203 and emergency reservoir charging passage 213 and to move the auxiliary slide valve 30 relative to the main slide valve to open the service port 226 and to then move the auxiliary slide valve to its quick service position.

In the initial quick service position of the auxiliary slide valve 30, the cavity 226 maintains the ports 204 and 227 in the main slide valve connected, so that the piston chamber 46 of the relay release valve device is maintained charged with fluid at auxiliary reservoir pressure and as a result the spring 54 still acts to maintain the relay release valve device in its normal release position. Further, with the auxiliary slide valve in quick service position, a cavity 231 in the valve connects a port 232 in the main slide valve to a port 233 also in the main slide valve. At the seat of the main slide valve, the port 232 is connected to the passage 106 to which the brake pipe is normally open by way of restricted passage 101, passage 99, quick service limiting valve chamber 100, passage 102, and past the check valves 103 and 104, and the port 233 is in registration with a passage 234 leading to a quick service bulb 235 which is constantly open to the atmosphere through a restricted passage 236. With the ports 232 and 233 thus connected together, fluid under pressure is permitted to flow from the brake pipe to the quick service bulb 235 and from thence is permitted to flow to the atmosphere by way of the restricted passage 236.

The initial local quick service flow of fluid from the brake pipe to the quick service bulb 235 is at a fast rate until the brake pipe pressure equalizes into the bulb and then continues at a slower rate as governed by the flow area of the restricted passage 236. The initial flow of fluid to the bulb produces a sudden but limited quick service reduction in pressure in the brake pipe for initially hastening the operation of the equalizing valve device on the next car in a train. The equalizing valve device on said next car then operates in a similar manner, and in this way, quick serial response to the brake pipe reduction is transmitted from one car to the next throughout the length of the train. The continued reduction in brake pipe pressure at the slower rate is for the purpose of insuring movement of the local equalizing valve parts to service position.

When the piston 27 and graduating valve 30 move to the initial quick service position, the lug 41 on the piston stem 28 engages the rear surface 42 of the main slide valve 29, so that upon the continued movement of the piston toward service position, the main slide valve will be shifted in the same direction.

As the main valve continues to move it laps the passage 106, closing off the further quick service flow of fluid from the brake pipe to the atmosphere by way of the bulb 235. At substantially the same time as the passage 106 is lapped, the service port 230, which has been previously uncovered by the auxiliary slide valve 30, is cracked open to a passage 237, which leads to the passage 60, so that fluid under pressure now starts to flow from the equalizing piston chamber 31 and connected auxiliary reservoir to the chamber 138 of the displacement volume device 9 by way of the service port 230, passage 237, passage 60, passage 61 and pipe 63. Fluid under pressure thus supplied to the passage 61 flows therefrom to the check valve chamber 62 of the double check valve device 11 and causes the check valve member to move in a direction toward the left hand from the position in which it is shown to a position in which the check valve 133 seals against the gasket 131 and the valve 132 is out of engagement with the gasket 130. This movement will be prompt since the chamber at the left hand side of the double check valve member is connected to the atmosphere by way of passage and pipe 134 and straight air pipe 2.

With the valve 132 out of engagement with the gasket 130, fluid under pressure supplied to the valve chamber 62 by way of passage 61 flows through passage and pipe 84 to the piston chamber of the relay valve device 7 and causes the relay valve device to operate to close the exhaust communication from the brake cylinder to the atmosphere and to open the supply communication to permit fluid under pressure to flow from the supply reservoir 6 to the brake cylinder 8.

At substantially the same time as the service port is cracked open to the passage 237 or slightly in advance of this, a cavity 238 in the main slide valve 29 connects the passage 47 to an atmospheric passage 239 and since the passage 47 is in communication with the piston chamber 46 of the relay release valve device, fluid under pressure now flows from said chamber to the atmosphere.

With the chamber 46 thus vented, fluid under pressure in the valve chamber 33 causes the piston 48 to promptly move to its extreme right hand position against the opposing pressure of spring 54. The piston acting through the piston stem 49 shifts the relay release slide valve 50 to its extreme right hand position in which the slide valve laps the passage 60 and therefore cuts off communication from this passage to the atmospheric passage 206 leading to the retainer valve device 10.

At substantially the same time as the slide valve laps the passage 60 it also laps the passage 209 leading to the supply reservoir and the passage 219 leading to the seat for the slide valve 68 of release relay interlock valve device. With the relay release slide valve 50 in its extreme right hand position, the cavity 205 therein connects the passage 209 to the atmospheric passage 206, so that fluid under pressure which may leak from the supply reservoir past the check valves 211 and 210 will flow to the atmosphere, thus preventing a build up of fluid pressure on the face of the slide valve, thereby insuring against the slide valve being blown from its seat by the leakage fluid.

Immediately following the cracking open of the service port 230 to the passage 237, a cavity 240 in the main slide valve 29 connects the brake pipe passage 106 to the restricted passage 185, so that fluid under pressure now flows at a slow rate from the brake pipe to the chamber 138 of the displacement volume device 9 and piston chamber of the relay valve device 7 by way of passage 106, cavity 240, passage 185 having a restriction 241, passage 225, passage 60 and the communication therefrom to both the relay piston chamber and displacement volume device 9.

The piston 27 of the equalizing valve device and slide valves 29 and 30 continue to move to service position in which the piston seals against the gasket 15. With the main slide valve 29 in service position, the service port 230 is fully open to the passage 237 leading to the relay valve device 7 and displacement volume device 9, so that the relay valve device will be caused to operate to provide the desired service rate of flow of fluid from the supply reservoir 6 to the brake cylinder 8.

Fluid under pressure flows from the passage 60 to the diaphragm chamber 59 of the relay release interlock valve device and when the pressure in this chamber has been increased to around ten pounds, the diaphragm is caused to flexed in a direction toward the right hand and, as it is thus flexed, shifts the follower 66 and follower stem in the same direction against the opposing pressure of the spring 73 acting through the medium of the plunger 71, the stem shifting the slide valve 68 to its extreme right hand position. With the slide valve 68 in this position a cavity 242 in the valve connects the passage 228 to a passage 243 leading to the atmosphere and a cavity 244 in the valve connects the emergency reservoir passage 79 to the passage 219. Since the passage 219 is lapped by the relay release slide valve 50 there can be no flow of fluid from the fully charged emergency reservoir to the auxiliary reservoir. The valve chamber 64 is constantly connected to the atmosphere by way of passage 65 and this passage is restricted so as to prevent any serious loss of fluid pressure from the piston chamber of the relay valve device 7 in the event of the rupture of the flexible diaphragm 57.

Fluid under pressure supplied to the passage 84 by the equalizing valve device flows through passage 83 to diaphragm chamber 82 of the combined cut-off and quick service limiting or modifying valve device 20. Fluid under pressure in this chamber when it has been increased sufficiently to overcome the opposing pressure of the spring 88, say for instance fourteen pounds, causes the diaphragm to flex in a direction toward the right hand and as it flexes shifts the follower in the same direction. The follower as it is thus shifted causes the bell-crank lever 91 to rock in a clockwise direction about the pin 92, the lever acting through the medium of the plunger 94 and spring 96 to seat the valve 97 on the seat rib 98. After the valve is seated the spring 96 acts to prevent the diaphragm and lever assembly from exerting excessive pressure on the valve 97, thus insuring against damage of the valve.

With the valve 97 seated, communication between the valve chamber 100 and passage 102 is closed so that the quick service flow of fluid from the brake pipe to the piston chamber of the relay valve device 7 and chamber 138 of the displacement volume device 9 is cut off. Since the passage 102 also leads to the supply reservoir the valve 97 when seated cuts off communication from the brake pipe to the reservoir.

Fluid under pressure being supplied by the equalizing valve device to the piston chamber of the relay valve device 7 and to chamber 138 of the displacement volume device 9 by way of the service port 230 and passages 237 and 60 flows from passage 60 through passage 225, passage 185, a passage 245, a cavity 246 in the emergency main slide valve 157 and a passage 247 to the safety valve device 151. When the pressure of fluid in the relay piston chamber and in the chamber 138 of the displacement volume device 9 and consequently in the safety valve device has been increased to around sixty pounds, the safety valve device will operate to permit fluid under pressure to flow from the passage 247 to the atmosphere thus limiting the pressure obtainable in said chambers and thereby the pressure of fluid in the brake cylinder to sixty pounds. It will be understood that the safety valve device may be adjusted to limit the pressure obtainable to more or less than sixty pounds.

Upon the service rate of reduction in the pressure of fluid in the emergency piston chamber 153, fluid at quick action chamber pressure in valve chamber 159 causes the emergency piston 155 and thereby the auxiliary slide valve 158 to move in the direction toward the right hand, relative to the main slide valve 157. As the piston is thus moving it closes the restricted passage 223 leading from the piston chamber to the quick action chamber and valve chamber charging passage 160. At substantially the same time as the piston closes the passage 223, a port 248 in the auxiliary slide valve 158 is opened to a port 249 in the main slide valve 157, which latter port is connected to a passage 250 leading to the atmosphere. Fluid under pressure now flows by way of this communication from the emergency slide valve chamber 159 and connected quick action chamber 161 to the atmosphere at a rate substantially equal to the service rate of reduction in the pressure of fluid in the emergency piston chamber, so that the operating fluid pressure differential on the piston 155 is substantially destroyed. In the service position of the emergency piston, the plunger 168 carried by the piston stem 156, is adapted to just engage the rear end surface 167 of the main slide valve 157, so that unintentional further movement of the piston and auxiliary slide valve toward the right hand is prevented by the action of the spring 169.

If it is desired to effect a full service application of the brakes the operator will permit a full service reduction in brake pipe pressure to be effected after which he will, by the use of the brake valve mechanism cause the venting of fluid under pressure from the brake pipe to be cut off. Now when the pressure of fluid in the valve chamber reduces by flow of fluid therefrom to the atmosphere by way of the service port 230 and safety valve device 151 to substantially the pressure of fluid in the brake pipe, the spring 45 of the stabilizing mechanism carried by the equalizing piston stem cooperates with the main slide valve to move the equalizing piston 27 out of sealing engagement with the gasket 15. After the piston seal is thus broken, the spring 45 acts to continue the movement of the piston and auxiliary slide valve 30 toward service lap position, but just before the service port 230 is fully lapped by the auxiliary slide valve, the end of the plunger engages the piston stem, so that the spring 45 will no longer act to move the piston and auxiliary slide valve toward lap position. Now, a slight fluid pressure differential on the piston, which will be caused by the pressure of fluid in the valve chamber 31 reducing slightly below the brake pipe pressure in piston chamber 22, moves said piston and thereby the auxiliary slide valve to lap position in which the valve fully laps the service port 230 and thus cuts off the further flow of fluid under pressure from the chamber 31 and connected auxiliary reservoir.

When the further venting of fluid under pressure from the brake pipe is cut off, the quick action chamber pressure in the emergency slide valve chamber 159 continues to reduce through the registering ports 248 and 249 in the auxiliary and main slide valves, respectively, until the pressure of fluid in said chamber is slightly below brake pipe pressure in piston chamber 153, at which time the pressure differential created on the emergency piston 155 causes the piston and thereby the auxiliary slide valve 30 to return to full release position, in which position the ports 248 and 249 in the emergency slide valves are out of registration with each other, so that further reduction in the pressure of fluid in the emergency valve chamber 159 does not occur.

It will be understood that when the equalizing valve device effects a quick service reduction in brake pipe pressure the check valves 107 and 108 prevent back flow of fluid from the supply reservoir and auxiliary reservoir to the passage 102 thereby preventing loss of fluid pressure from these reservoirs as well as interference with the quick service flow of fluid which would otherwise be the case if the check valves were not provided.

Limited automatic service application of the brakes

If, instead of effecting a full service application of the brakes as just described, it is desired to effect a limited application, the brake pipe pressure is only reduced an amount sufficient to effect the desired service application. When such a reduction has been effected the several parts of the equipment will function to supply fluid under pressure to the brake cylinder, following which the equalizing valve device and emergency valve device will move to service lap position in the same manner as has been described in connection with a full service application of the brakes.

If, after a limited application of the brakes has been effected, it is desired to increase the brake cylinder pressure, a further reduction in brake pipe pressure is effected through the medium of the brake valve mechanism, which causes the equalizing piston 27 to move from service lap position toward service position shifting the auxiliary slide valve 30 to uncover the service port 230, so that fluid under pressure again flows from the auxiliary reservoir to the piston chamber of the relay valve device and to the chamber 138 of the displacement volume device 9 causing the relay valve device to operate to supply additional fluid under pressure from the supply reservoir 6 to the brake cylinder 8. It will be noted that the movement of the piston and slide valve from service lap position to the position for opening the service port is unopposed by the spring 45. By reason of this the equalizing piston and auxiliary slide valve will promptly move to reapplication position upon a very light reduction in brake pipe pressure.

The emergency valve device will respond to this reduction in brake pipe pressure to vent fluid under pressure from the emergency slide valve chamber and connected quick action chamber in the same manner as described in connection with the full service application of the brakes.

Automatic release of a service application of the brakes

To effect a release of the brakes following a service application thereof, fluid under pressure is supplied to the brake pipe 1 and flows therefrom to the equalizing piston chamber 22 and emergency piston chamber 153 in the same manner as has before been described in connection with the initial charging of the equipment.

At the head end of the train where the brake pipe pressure increases more rapidly than at the rear end of the train there is created on the equalizing valve piston 27 a pressure differential which causes the piston and thereby the slide valves 29 and 30 to promptly move to their outer or normal release position, as shown, in which position the collar 41 on the piston stem 28 engages the movable stop 38. In this release position the feed groove 203 around the piston 27 is open, so that fluid under pressure is permitted to flow from the piston chamber 22 to the slide valve chamber 31, but the flow capacity of this feed groove is not great enough to permit fluid to flow therethrough at as fast a rate as fluid is supplied to the piston chamber on cars at the head end of the train. As a result, a sufficient pressure differential is created on said piston to cause it and the slide valves 29 and 30 to move to an inner release position against the opposing pressure of the spring 39 acting through the medium of the stop 38 and piston stem 28.

In either the outer or inner release position of the equalizing valve device, the port 204 in the main slide valve 29 is in open communication with the passage 47 connected to the piston chamber 46 of the relay release valve device, and since, in either of the release positions, the port 204 is not closed off by the auxiliary slide valve 30, fluid under pressure flows from the valve chamber 31 to the relay release piston chamber 46. The pressure of fluid in piston chamber 46 quickly equalizes with that in valve chamber 33, so that the spring 54 now acts to move the piston 48 and slide valve 50 to their normal release position as shown. The valve as it is being moved to this position opens the passage 219, so that fluid under pressure is also supplied to the equalizing slide valve chamber 31 and auxiliary reservoir from the fully charged emergency reservoir 5 by way of pipe and passage 80, passage 79, a choke plug 252 interposed in the passage 79, cavity 244 in the relay release interlock slide valve 68, passage 219 and relay release slide valve chamber 33. Due to the restricting of the flow of fluid from the brake pipe to the auxiliary reservoir and to the supplying of fluid from the emergency reservoir to the auxiliary reservoir the amount of fluid taken from the brake pipe will not be great, so that more fluid will flow toward the rear end of the train than would otherwise be the case, thus hastening the charging of the brake pipe on cars at the rear end of the train.

With the relay release slide valve 50 in release position the port 208 therein registers with passage 209 so that fluid under pressure flows from the slide valve chamber 33, which is connected to the auxiliary reservoir, to the supply reservoir 6 by way of port 208, passage 209, past check valves 210 and 211, spring chamber 112, passage 113 and connected pipes 115 and 116.

Further with the slide valve 50 in release position, the cavity 205 in the valve connects the passage 60 to the passage 260, and since the piston chamber of the relay valve device 7, chamber 138 of the displacement volume device 9, diaphragm chamber 82 of the combined cut-off and quick service limiting valve device, and diaphragm chamber 59 of the relay release interlock valve device are connected to the passage 60 and this passage 60 is open to the atmosphere by way of the retaining valve device 10, fluid under pressure is vented from these chambers to the atmosphere.

Upon thus venting fluid under pressure from the piston chamber of the relay valve device 7 and chamber 138 of the displacement volume device 9, said relay valve device operates to release fluid under pressure from the brake cylinder, thus initiating the release of the brakes.

When the pressure of fluid in the diaphragm chamber 82 has reduced to slightly below fourteen pounds, the compressed spring 88 acts to shift the follower stem 89 and thereby the follower 87 and diaphragm 81 to normal release position as shown, the stem in its traverse actuating the bell-crank lever 91 to move the valve 97 out of seating engagement with the seat rib 98. With the valve unseated fluid under pressure flows from the brake pipe passage 99 through chamber 100 and past the valve 97 to the passage 102 and if the brake pipe pressure is five pounds higher than auxiliary reservoir pressure, fluid under pressure flows from the passage 102 past the check valves 107 and 108 to the chamber 110 and from thence flows through passage 111, chamber 112, passage 113, choke plug 114 and pipes 115 and 116 to the supply reservoir 6, thus accelerating the rate of recharge of the supply reservoirs.

When the pressure of fluid in the diaphragm chamber 59 of the relay release interlock valve device has been reduced to slightly below ten pounds, the compressed spring 73, acting through the medium of the stop 71 moves the follower stem 67 and thereby the follower 66, diaphragm 57 and slide valve 68 to normal release position as shown, the slide valve in its traverse cutting off communication between the passages 79 and 219 and thereby between the emergency and auxiliary reservoirs, and also cutting off communication between the atmospheric passage 243 and the passage 228 and further, establishing communication, by way of the cavity 229, between the passage 228 and the auxiliary reservoir passage 35.

When, due to the flow of fluid from the emergency reservoir to the auxiliary reservoir, the emergency reservoir pressure is reduced to that of brake pipe, fluid under pressure flows from the equalizing piston chamber to the reservoir by way of passage 213, past the check valves 214 and 215, choke plug 217, passage 218 and passage and pipe 80.

When, in releasing the brakes, the brake pipe pressure in chamber 119 at one side of the flexible diaphragm 117 of release insuring valve device exceeds auxiliary reservoir pressure in the diaphragm chamber 120 at the other side by a predetermined amount as fixed by the value of the spring 124, say about one and one half pounds, said diaphragm will flex in a direction toward the right hand, actuating the follower 126 to unseat the valve 122. The piston 27 and slide valves 29 and 30 of the equalizing valve device are intended to move from application position to release position when the brake pipe pressure in piston chamber 22 exceeds auxiliary reservoir pressure in valve chamber 31 by about one and one-quarter pounds, so that the main slide valve 29 will, under normal conditions, lap the passage 123 before the release insuring valve 122 is unseated and prevent the release of fluid under pressure from the auxiliary reservoir when the valve is unseated. If, however, a greater pressure differential is required to move the equalizing piston to release position than is required to unseat the valve 122, the valve will be unseated before the piston moves to application position, and since in application position the passage 123 is open to the atmosphere by way of the cavity 238 in the main slide valve and passage 239, fluid under pressure will flow from the equalizing valve chamber 31 and connected auxiliary reservoir to the atmosphere by way of passage 121, valve chamber 120, past the unseated valve 122, passage 123, cavity 238 and passage 239.

On cars toward the rear end of a long train where the rate of increase in brake pipe pressure will be slow, the equalizing valve parts have a tendency to be delayed in their movement from application position toward release position, and in some cases, may have a tendency to remain in application position. However these objectionable tendencies will be eliminated, for where the rise in brake pipe pressure above auxiliary reservoir pressure exceeds the desired amount, fluid under pressure will, as just described, be vented from the auxiliary reservoir to the atmosphere with the valve 122 unseated until a sufficient pressure differential is created on the equalizing piston 27 to cause it to move the main slide valve 29 toward release position so as to cut off any further venting of fluid from the auxiliary reservoir. When the main slide valve is moved to release position a port 253 in the main slide valve cuts the passage 123 into communication with the valve chamber 31 so the pressure of fluid on the seating side of the valve 122 will be equal to the pressure of fluid on the opposite side. By reason of such equalization the valve will not be urged to its seat by fluid under pressure but rather by the pressure of the spring 124 only, thus preventing overloading and consequent damage or excessive wear of the valve. The advantages of this release insuring valve device will be readily appreciated if it be kept in mind that the release of the brakes, especially at the rear end of long trains, has been one of the greatest difficulties in railroad operation up to the present time.

*Graduated release of the brakes by means of the automatic brake equipment*

When it is desired to graduate the release of the brakes, i. e., release the brakes in steps or increments, the brake pipe pressure is increased in steps through the operation of the brake valve mechanism.

Assuming the several parts of the equipment to be in service position as hereinbefore described and it is desired to effect the graduated release of the brakes, the brake valve mechanism is moved to increase brake pipe pressure the desired amount to cause the parts to move to release position and is then caused to move to lap position in which the flow of fluid to the brake pipe is cut off.

With the parts of the equalizing valve device in release position, fluid under pressure is vented from the piston chamber of the relay valve device 7 and chamber 138 of the displacement volume device 9 in the same manner as described in connection with the full or complete release of the brakes. This causes the relay valve device 7 to operate to initiate a reduction in brake cylinder pressure.

With the brake valve mechanism in lap position, it is obvious that there will be no further increase in brake pipe pressure, and as a result, the pressure of fluid in the equalizing valve chamber 31 will be increased by the flow of fluid from the fully charged emergency reservoir by way of pipe and passage 80, passage 79, choke plug 252, cavity 244 in the relay release interlock slide valve 68, passage 219, valve chamber 33 of the relay release valve device, and passage 32. When the pressure of fluid in chamber 31 slightly exceeds brake pipe pressure in piston chamber 22, fluid under pressure in said chamber 31 causes the piston 27 and thereby the auxiliary slide valve 30 to move toward the left relative to the main slide valve 29. The piston and slide valve move but a very short distance when the piston closes the feed groove 203 and the cavity 226 in the slide valve connects the ports 204 and 227 in the main slide valve. Now, since the port 227 is in communication with passage 228 which is connected to the atmosphere by way of the cavity 242 in the slide valve 68 of the relay release interlock valve device and passage 243 and since the port 204 is connected to the passage 47 leading from the piston chamber 46 of the relay release valve device, fluid under pressure is vented from this piston chamber to the atmosphere. With the chamber 46 thus vented the relay release piston 48 operates quickly to shift the slide valve 50 to its extreme right hand position, the valve in its traverse lapping the passage 219 and thereby cutting off the flow of fluid from the emergency reservoir to the valve chamber 33 and connected auxiliary reservoir, and closing communication from the passage 60 to the passage 206 leading to the atmosphere thereby cutting off the exhaust flow of fluid from the piston chamber of the relay valve device 7 and chamber 138 of the displacement volume device 9. The relay valve device now operates to cut off the exhaust flow of fluid under pressure from the brake cylinder.

Since the flow of fluid from the emergency reservoir to the equalizing piston chamber 31 is cut off by the relay release slide valve 50 there can be no further increase in the pressure of fluid in this chamber and since there is no further increase in brake pipe pressure the equalizing piston and auxiliary slide valve come to a stop before the cavity 231 in the valve can connect the quick service port 232 in the main slide valve to the quick service port 233 also in the main slide valve.

When it is desired to make another step reduction in brake cylinder pressure, the brake valve mechanism is operated to supply fluid under pressure to the brake pipe to produce the desired reduction in brake cylinder pressure and is then operated to cut off the supply of fluid under pressure to the brake pipe. The increase in brake pipe pressure causes the equalizing piston 27 and auxiliary slide valve 30 to be shifted to release position in which the port 204 is again opened to the valve chamber 31 and consequently to the auxiliary reservoir permitting fluid under pressure to flow from the valve chamber to the piston chamber 46 of the relay release valve device. The pressure in this chamber quickly equalizes with that in valve chamber 33 so that the spring 54 acting through the medium of the plunger 51 moves the piston 48 and thereby the slide valve 50 to release position in which fluid under pressure is vented from the piston chamber of the relay valve device 7 and chamber 138 of the displacement volume device 9. Under the influence of such reduction the relay valve device operates to vent fluid under pressure from the brake cylinder. With the brake valve mechanisms in position to cut off the supply of fluid under pressure to the brake pipe, the equalizing valve device and relay release valve device operate to cut off the flow of fluid from the emergency reservoir to the auxiliary reservoir and to cut off the flow of fluid from the piston chamber of the relay valve device 7 and chamber 138 of the displacement volume device 9, so that the relay valve device will be caused to operate to cut off the flow of fluid from the brake cylinder.

It will be understood that through the operation of the brake valve mechanism the equalizing valve device 17, relay release valve device 18, and relay valve device 7 may be caused to operate to reduce brake cylinder pressure in as many successive steps or increments as desired, until such time as the pressure of fluid in the piston chamber of the relay valve device 7 and connected diaphragm chamber 59 of the relay release interlock valve device has been reduced to slightly below ten pounds. When the pressure of fluid in diaphragm chamber 59 has been reduced to this low degree the spring 73 of the relay release interlock valve device, acting through the medium of the plunger 71 and follower stem 67, shifts the slide 68 to its extreme left hand position in which the communication between the emergency reservoir passage 79 and passage 219 is cut off, so that fluid under pressure can no longer flow from the emergency reservoir to the auxiliary reservoir. As a result, the several parts of the equalizing valve device remain in this position and cause the complete release of the brakes to be effected.

It has hereinbefore been stated that when in graduating the release of the brakes the relay release valve device cuts off the flow of fluid from the emergency reservoir to the auxiliary reservoir the equalizing piston 27 and auxiliary slide valve 30 come to a stop before said valve connects the quick service ports 232 and 233 together. However, under certain conditions of service, as will now be described it is possible for the piston and slide valve to unintentionally move to this position.

It is well known that with the brake valve mechanism in charging position, the brake pipe pressure on cars at the head end of the train will be increased at a faster rate than on the cars at the rear end of the train and that this high head of pressure at the head end of the train will reduce as fluid flows therefrom toward the rear end, the degree of reduction depending upon the length of the train.

On a train of such a length that this reduction in brake pipe pressure on the cars at the head end of the train may be so great that the pressure of fluid in the equalizing piston chamber will be insufficient to cause the equalizing piston 27 and auxiliary slide valve 30 to come to a stop in the position intended, but may permit them to continue to move to initial quick service position against the opposing pressure of the stabilizing spring 45 in which quick service position the cavity 231 in the auxiliary slide valve establishes communication between the quick service ports 232 and 233 in the main slide valve 29.

When this occurs in an equalizing valve device of the type in which there is nothing interposed between the brake pipe and one of the quick service ports in the main slide valve for controlling the quick service flow of fluid from the brake pipe, fluid under pressure is vented from the brake pipe to the quick service chamber 235. Due to this venting the equalizing piston cannot now operate to move the auxiliary slide valve 30 rearwardly out of initial quick service position, so that brake pipe pressure continues to reduce by way of the restricted passage 236, causing the equalizing piston and slide valves to move to application position, thus the brake cylinder pressure will be increased when a decrease is desired.

According to the invention this undesired action cannot occur for the reason that when an application of the brakes is being effected, the combined cut-off and quick service limiting valve device 20 functions to close communication from the brake pipe to the seat for the equalizing main slide valve 29 and to maintain the communication closed until the brake cylinder pressure has been reduced to such a low degree that no further release graduations are either necessary or desirable.

From the foregoing description it will be seen that since the valve device 20 prevents the quick service flow of fluid from the brake pipe when, in graduating the release of the brakes, the auxiliary slide valve 30 of the equalizing valve device is accidentally moved to initial quick service position, the unintentional movement of the several parts of the equalizing valve to application position is effectively prevented.

*Automatic emergency application of the brakes*

An emergency application of the brakes is effected when fluid under pressure is suddenly vented from the brake pipe and such a reduction may be effected by the operation of the brake valve mechanism to emergency position, by the operation of the usual conductor's valve device, or by the parting of the brake pipe hose which usually spans the space between adjacent cars.

Upon a sudden reduction in brake pipe pressure the equalizing valve device operates, in the same manner as in effecting an automatic service application of the brakes, to supply fluid under pressure from the auxiliary reservoir 4 to the piston chamber of the relay valve device 7.

At substantially the same time as the equalizing valve device operates upon an emergency reduction in brake pipe presure, fluid in the emergency valve chamber 159, acting on the inner face of the emergency piston 155, causes the piston to move and first shift the auxiliary slide valve 158 relative to the main slide valve 157 and then shift both slide valves in unison to emergency position, in which position the outer face of the piston engages the gasket 16.

As the piston is thus moved it closes communication from the piston chamber 153 to the passage 223 leading to the valve chamber 159 and quick action chamber 161, after which the auxiliary slide valve 158 uncovers a port 254 in the main slide valve, which port, at the seat for the main slide valve, is in open communication with passage 196, so that fluid under pressure now flows through this communication from the emergency slide valve chamber and quick action chamber to the piston chamber 187 of the quick action vent valve device.

After the port 254 has been uncovered the collar 166 on the emergency piston stem 156 engages the rear end surface 167 of the main slide valve 157, so that the piston as it continues to move, shifts the main slide valve to emergency position.

Now as the main slide valve is moved toward emergency position, the end of the valve moves beyond the passage 196, so that fluid under pressure flows directly from the valve chamber 159 to the passage. It will here be noted that as the passage 254 is being moved out of registration with the passage 196, the end of the main slide valve is uncovering the passage 196, so that there will be no interruption in the flow of fluid to the quick action piston chamber 187.

The pressure of fluid thus supplied to the piston chamber 187 causes the quick action piston 188 to move toward the right hand to unseat the quick action vent valve against the opposing pressure of the spring 193. With the valve unseated fluid under pressure is suddenly vented from the brake pipe for the purpose of serially transmitting emergency action throughout the length of the train in the usual well known manner.

With the main slide valve 157 in emergency position the passage 149 is connected through a cavity 255 in the valve to a passage 256 leading to the atmosphere so that fluid under pressure is vented from the chamber 186 of the high pressure valve device. Upon thus venting this chamber, fluid at emergency reservoir pressure in chamber 181 causes the high pressure valve piston 179 to move in a direction toward the left hand unseating valve 180. With the valve 180 unseated fluid under pressure flows from the emergency reservoir to the piston chamber of the relay valve device 7 and chamber 138 of the displacement volume device 9 by way of pipe and passage 80, valve chamber 181, past the unseated valve 180, passage 185, cavity 240 in the equalizing main slide valve 29, passage 237, passage 60 and the communications from the passage 60 to the chambers.

Further, the emergency main slide valve in emergency position laps the passage 247 leading to the safety valve device 151, thus preventing fluid under pressure being supplied to the relay piston chamber from escaping to the atmosphere by way of the safety valve device. With the safety valve device thus cut out of action the pressure of fluid obtained in the relay piston chamber and consequently in the brake cylinder will be higher than could otherwise be obtained.

With the quick action piston 188 in its inner position in sealing engagement with the gasket 200, fluid under pressure from the piston chamber 187 and consequently from the emergency slide valve chamber 159 and connected quick action chamber 161 is vented to the atmosphere by way of the restricted port 199 and passages 198 and 195.

Upon the substantially complete venting of the quick action chamber fluid, the pressure of the compressed spring 169, acting through the medium of the emergency piston stem 156 causes the emergency piston and thereby the auxiliary slide valve 158 to move relative to the main slide valve toward release position, but upon the engagement of the end of the plunger 168 by the stem 156, the spring 169 will no longer act to retract the piston and auxiliary slide valve, and as a result of this, the movement of the piston and slide valve ceases before the piston engages the front end surface of the main slide valve. As a consequence, the main slide valve 157 and thereby the high presure valve remains in emergency position. The equalizing valve device also remains in application position.

Upon the substantially complete venting of the quick action fluid the spring 193 acts to seat the vent valve 190 thereby cutting off the quick action vent from the brake pipe to the atmosphere.

Release of the brakes after an emergency application

To effect a release of the brakes after an emergency application, fluid under pressure is supplied to the brake pipe 1 and flows to the equalizing piston chamber 22 and to the emergency piston chamber 153. Fluid in the valve chamber 31 of the equalizing valve device is at reduced auxiliary reservoir pressure and fluid in the emergency valve chamber 159 is at atmospheric pressure, so that upon a slight increase in brake pipe pressure the emergency piston and slide valves will move to either an outer or an inner release position before the equalizing piston 27 is caused to move toward release position.

With emergency main slide valve in either release position the cavity 224 therein connects the passage 174 to the passage 149 so that fluid at reduced emergency reservoir pressure is admitted to the spring chamber 186 of the high pressure valve device. Now since the fluid in chamber 183 is at the same pressure as that in chamber 186, the spring 182 acts to move the valve piston 179 to seat the valve 180 on the seat rib 181, thus cutting off communication from the emergency reservoir to the passage 185 which is in communication with the piston chamber of the relay valve device 7 and chamber 138 of the displacement volume device 9.

It will be understood that the flow area of the passage 223 which connects the emergency piston chamber to the passage 160 leading to both the emergency slide valve chamber 159 and quick action chamber 161 is inadequate to offset the rate at which the pressure of fluid in the emergency piston chamber 153 is increased on cars at the head end of the train, so that the emergency piston is moved upon a slight increase in brake pipe pressure, say for instance seven pounds, to its inner or back dump position. The movement of the piston between its normal or outer release position to its inner or back dump position being opposed by the spring 164 acting through the medium of the movable stop 163 and the piston stem 156.

With the several parts of the emergency valve device in back dump position the cavity 246 in the main slide valve connects the passage 245 to a back dump passage 258 leading to the brake pipe by way of a ball check valve 259, a spring weighted check valve 260, a passage 261, quick action vent valve chamber 191 and brake pipe passage 192. Since the passage 245 is in communication with the piston chamber of the relay valve device 7, chamber 138 of the displacement volume device 9 and auxiliary reservoir fluid under pressure flows rapidly from these chambers and auxiliary reservoir to the brake pipe thus accelerating the rate of recharge of the brake pipe. This back dump action naturally occurs first at the head end of the train where the increase in brake pipe pressure is greatest and first effective, and the sudden increase in brake pipe pressure on one car causes the emergency valve device on the next car to function in the same manner, so that the back dump action is rapidly transmitted serially from car to car throughout the length of the train.

After the brake pipe pressure is suddenly increased by the supply of fluid as just described, the charging of the brake pipe is continued in the usual manner, i. e., through the medium of the brake valve mechanism. As the brake pipe pressure is thus increased the equalizing valve device functions to effect the release of the brakes in the same manner as described in connection with the release of the brakes following a service application of the brakes.

When the pressure of fluid in emergency piston chamber 153 and valve chamber 159 substantially equalize, the spring 164, acting through the medium of the stop 163, moves the main slide valve 157 and thereby the associated parts of the device to their outer or normal release position.

From the passage 84 fluid under pressure flows through passage 83 to the diaphragm chamber 82 of the combined cut-off and quick service limiting valve device 20. When the pressure of fluid in this chamber has been increased to about fourteen pounds, the diaphragm 82 is caused to flex in a direction toward the right hand actuating the follower 87 and follower stem 89 and thereby the bell crank lever 91 and plunger 94 to seat the valve 97 on the seat rib. With the valve thus seated, communication between the brake pipe passage 99 and the passage 102 is closed, so that there can be no flow of fluid from the brake pipe to the supply reservoir, which reservoir due to the flow of fluid therefrom, is reducing in pressure. It will here be noted that as the pressure of fluid in the relay piston chamber and diaphragm chamber 82 is increasing the valve 97 will remain unseated until such time as the pressure of fluid in chamber 82 has been increased to around fourteen pounds.

It should here be mentioned that in effecting the release of the brakes following either a heavy automatic service application or an emergency application the brake pipe may be increased at such a fast rate that if the combined cut off and quick service limiting valve 97 were not maintained seated, the check valve 108 would be caused to move upwardly from its seat against the opposing pressure of the spring 109 and thereby permit fluid under pressure from the brake pipe to the supply reservoir. By preventing such flow more air is available for charging the rear end of the train thus assisting in accelerating the release of the brakes toward the rear end of the train.

Straight air application of the brakes

When it is desired to effect a straight air application of the brakes, the operator, by the use of his brake controlling mechanism causes fluid under pressure to be supplied to the straight air pipe 2.

From the straight air pipe 2 fluid under pressure flows through pipe and passage 134 to the left hand side of the valve member of the double check valve device 11. If the valve member is in the position in which it is shown in the drawing, fluid under pressure from passage 134 flows past the unseated valve 133 and through passage and pipe 84 to the valve chamber of the relay valve device 7, but if the valve member should be in its extreme left hand position for conditioning the equipment for automatic control of the brakes, fluid under pressure flowing through passage 134 to the left hand side of the valve member causes the member to be quickly shifted to its extreme right hand position as shown in which the valve 132 closes communication from the passage 84 to the passage 61, and the valve 133 permits the flow of fluid from the passage 134 to the relay piston chamber.

Fluid under pressure thus supplied to the relay piston chamber causes the relay valve device 7 to function to supply fluid under pressure from the supply reservoir 6 to the brake cylinder 8 to effect an application of the brakes, the increase in brake cylinder pressure being commensurate with the increase in the relay piston chamber pressure.

As the pressure of the supply reservoir is being reduced by the flow of fluid therefrom to the brake cylinder by way of the relay valve device 7, fluid under pressure flows from the slide valve chamber 33 of the relay release valve device and consequently from the auxiliary reservoir to the supply reservoir 6 by way of port 208 in the relay release slide valve 50, passage 209, past the check valves 210 and 211, chamber 112, passage 113, choke plug 114 and pipes 115 and 116. At the same time as fluid under pressure is thus being supplied to the supply reservoir, fluid under pressure flows through the feed groove 203 from the brake pipe to the equalizing valve chamber 31 and consequently to the auxiliary reservoir which is in open communication with the valve chamber. The flow of fluid from the chamber 31 tends to reduce auxiliary reservoir below brake pipe pressure, so that brake pipe pressure in the equalizing piston chamber tends to maintain the equalizing piston in release position against accidental movement from such position.

The combined cut-off and quick service limiting valve device does not operate to cut off the communication from the brake pipe to the underside of the check valve 107 and 108 until the pressure of fluid in piston chamber of the relay valve device 7 has been increased to about fourteen pounds, but the flow of fluid from the supply reservoir to the brake cylinder to produce a corresponding brake cylinder pressure (fourteen pounds) will not reduce the pressure of fluid in chamber 110 sufficiently to permit fluid at brake pipe pressure acting on the underside of the check valve 108 to unseat the valve, so that direct flow of fluid from the equalizing piston chamber 22 to the supply reservoir will not occur during the period of time that the pressure of fluid in the relay piston chamber and diaphragm chamber 82 of the combined cut off and quick service limiting valve device is building up to fourteen pounds. This prevents a reduction in the piston chamber pressure which might otherwise occur and cause the equalizing valve parts to move to quick service position before the combined cut-off and quick service modifying valve device is caused to function to close communication from the piston chamber to the passage 102.

In practice it has been discovered that with combined automatic and straight air brake equipment heretofore employed there is a tendency for the equalizing piston to unintentionally move to quick service position, due to unavoidable erratic operations of the usual feed valve device, when a straight air application of the brakes is being effected. In these prior equipments the equalizing auxiliary slide valve in its traverse to quick service position connected the piston chamber of the relay release valve device to atmosphere, thereby permitting the several parts of the device to move to first cut off the spill-over communication from the auxiliary reservoir to the supply reservoir and to then cut off the release communication from the piston chamber of a brake controlling relay valve device to the atmosphere by way of the retaining valve device. At the time the stabilizing mechanism carried by the equalizing piston stem engages the rear surface of the equalizing main slide valve the piston closes the usual feed groove leading from the equalizing piston chamber to the equalizing slide valve chamber. With the feed groove and the communication from the auxiliary reservoir to the supply reservoir closed fluid at a pressure substantially equal to brake pipe pressure is trapped in the equalizing slide valve chamber and auxiliary reservoir, so that when the auxiliary slide valve moves to quick service position the equalizing piston quickly responds to the resulting quick service reduction in brake pipe pressure to move the slide valves to application position and this undesired application of the brakes will propagate from car to car throughout the length of the train.

Even though the equalizing piston may be brought to a stop at the time the stabilizing mechanism engages the main slide valve a very undesirable condition may develop to prevent a straight air release of the brakes from being effected as will be apparent from the following description.

With the stabilizing mechanism just in engagement with the main slide valve, the release relay slide valve is in application position in which the release communication from the chamber of the dummy brake cylinder or displacement volume device to the atmosphere is cut-off, so that if there should be any leakage of fluid past the seated valve of the double check valve device which selects between straight air and automatic control, the pressure in the displacement volume device will be increased as long as fluid under pressure is being supplied to the relay valve device to effect a straight air application of the brakes or until the pressure of fluid in the displacement volume device equalizes with the pressure of fluid being supplied through the straight air pipe. Now when fluid under pressure is vented from the straight air pipe to effect a release of the brakes, fluid under pressure which has leaked into the displacement volume device causes the double check valve device to move to automatic application position in which communication between the piston chamber of the relay valve device and the straight air pipe is cut off and communication between this piston chamber and the displacement volume device is established. From this it will be seen that the brakes instead of being released as intended will be maintained applied with a force dependent upon the pressure of fluid in the displacement volume device. The operator has no way of knowing that this undesirable condition exists when he again causes the train to be put in motion. This condition is serious in that when the train is thus put in motion, a light maintained brake application will cause excessive heating and wear of the brake shoes and wheels during the run, but the more serious damage is done when the retained brake application is such that the wheels are caused to slide on the track rails, which sliding action causes flat spots to be worn on the wheels. When wheels are thus damaged they must necessarily be replaced. This is of course very costly and therefore objectionable.

From the following description it will be seen that in the equipment shown in the drawing the above mentioned objectionable features have been eliminated.

If, when a straight air application of the brakes is being effected, the equalizing piston and auxiliary slide valve 30 should move unintentionally toward quick service position, the cavity 226 in the valve connects the ports 204 and 227 together so that the piston chamber 46 of the relay release valve device is maintained charged with fluid at auxiliary reservoir pressure by way of pipe and passage 35, cavity 229 in the relay release interlock valve device 19, passage 228, port 227 in the equalizing main slide valve 29, cavity 226 in the auxiliary slide valve 30, port 204 in the main slide valve and passage 47, the valve device 19 being maintained in its release position as shown by the action of the spring 73. With the pressure of chamber 46 maintained the relay release piston 48 and slide valve 50 will remain in their release position so that the communication between the auxiliary reservoir and supply reservoir is maintained open and fluid under pressure flowing through this communication will reduce auxiliary reservoir pressure below brake pipe pressure when the equalizing piston closes the feed groove 203. This reduction in auxiliary reservoir serves to prevent the several parts of the equalizing valve device from unintentionally moving to quick service position, thus insuring against the accidental movement of the several parts of the equalizing valve device to application position.

Fluid under pressure which may leak past the valve 132 of the check valve device to the passage 61 when a straight air application of the brakes is being effected flows through passage 60, cavity 205 in the relay release slide valve 50, passage 206, pipe 205 and retaining valve device 10 to the atmosphere, so that there can be no build up in pressure in the chamber 138 of the displacement volume device 9. From this it will be apparent that when fluid under pressure is vented from the straight air pipe to effect a release of the brakes the valve member of the check valve device 11 will remain in its straight air position and permit the complete release of the brakes.

Straight air release of the brakes

When it is desired to release a straight air application of the brakes fluid under pressure is vented from the straight air pipe 2 and consequently from the piston chamber of the relay valve device 7 which causes the relay valve device to function to release fluid under pressure from the brake cylinder to the atmosphere.

Straight air and automatic emergency application of the brakes

When the operator causes the brake valve mechanism to assume emergency position, fluid under pressure is supplied to the straight air pipe 2 and consequently to the chamber at the left hand end of the valve member of the check valve device 11, and fluid under pressure is vented at a sudden rate from the brake pipe 1. This reduction in brake pipe pressure causes the several parts of the brake controlling valve device 3 to operate in the same manner as has been described in connection with the automatic emergency application to supply fluid under pressure from both the auxiliary reservoir and emergency reservoir to the chamber at the right hand side of the valve member of the check valve device 11. The check valve device will now operate to permit fluid under pressure from the auxiliary reservoir, emergency reservoir and straight air pipe to equalize into the valve chamber of the relay valve device 7 and chamber 138 of the displacement volume device 9 at approximately one hundred pounds. This causes the relay valve device to provide a corresponding emergency brake cylinder pressure.

Release of the brakes following a straight air and automatic emergency application To release the brakes the brake valve mechanism is caused to operate to vent fluid under pressure from the straight air pipe 2 and to supply fluid under pressure to the brake pipe 1. Fluid under pressure thus supplied to the brake pipe causes the several parts of the brake controlling valve device 3 to move to their release position in the same manner as has been described in connection with the release of the brakes following an automatic emergency application. With the several parts of the brake controlling valve device in release position fluid under pressure may be released from the piston chamber of the relay valve device 7 by way of the relay release valve device 18 and retaining valve device 10 or may be released by way of the straight air pipe 2, depending upon the position which the valve member of the check valve device 11 may assume.

General considerations

Throughout the foregoing description the term brake valve mechanism has been used to mean any suitable control mechanism which may be set in operation by the operator of a train and may comprise the usual engineers automatic brake valve device for controlling the automatic portion of the equipment and a straight air brake valve having an emergency position in which a combined automatic and straight air emergency application of the brakes is caused to be effected. In some instances a single brake valve device may be employed which may be readily adjusted for either automatic or straight air control. The operator's control mechanism has not been illustrated for the reason that it is deemed unnecessary since all that concerns the present application with reference to the operator's control is the supply of fluid under pressure to and the release of fluid under pressure from the straight air pipe and the brake pipe.

It is to be understood that the brake equipment as shown may be employed without change in a train equipped for automatic control only but if the equipment is to be used in such a train for a long period of time the check valve 11 may be omitted and a blanking plate 300 used instead as shown in Fig. 2. This plate is secured to the pipe bracket 12 and at the left hand face of the pipe bracket blanks the straight air passage 134 and by means of a passage 301 therein establishes communication between the passage 61 of the automatic portion of the equipment and the application and release passage 84.

While one illustrative embodiment of our invention has been described in detail, it is not our intention to limit its scope to this embodiment or otherwise than by the terms of the appended claims.

Having now described our invention, what we claim as new and desire to secure by Letters Patent, is:

1. In a vehicle brake equipment, in combination, a communication through which fluid under pressure is supplied to effect an application of the brakes, a straight air pipe through which fluid under pressure may be supplied to said communication, a brake pipe, a brake controlling valve device operative upon a gradual reduction in brake pipe pressure for supplying fluid under pressure to said communication and operative upon a sudden reduction in brake pipe pressure for also supplying fluid under pressure to said communication, means operative to limit the pressure of fluid supplied by the brake controlling valve device in response to the gradual reduction in brake pipe pressure, valve mechanism responsive to the sudden reduction in brake pipe pressure for cutting said means out of operation, and valve means responsive to the pressure of fluid supplied through the straight air pipe for also cutting said means out of operation.

2. In a vehicle brake equipment, in combination, a communication through which fluid under pressure is supplied to effect an application of the brakes, a straight air pipe through which fluid under pressure may be supplied to said communication, a brake pipe, a brake controlling valve device operative upon a gradual reduction in brake pipe pressure for supplying fluid under pressure to said communication and operative upon a sudden reduction in brake pipe pressure for also supplying fluid under pressure to said communication, means operative to limit the pressure of fluid supplied by the brake controlling valve device in response to the gradual reduction in brake pipe pressure, valve mechanism responsive to the sudden reduction in brake pipe pressure for cutting said means out of operation, and valve means responsive to the pressure of fluid in the straight air pipe for also cutting said means out of operation and for admitting fluid under pressure from the straight air pipe to said communication.

3. In a vehicle brake equipment, in combination, a communication through which fluid under pressure is supplied to effect an application of the brakes, a straight air pipe through which fluid under pressure may be supplied to said communication, a brake pipe, a brake controlling valve device operative upon a gradual reduction in brake pipe pressure for supplying fluid under pressure to said communication and operative upon a sudden reduction in brake pipe pressure for also supplying fluid under pressure to said communication, means operative to limit the pressure of fluid supplied by the brake controlling valve device in response to the gradual reduction in brake pipe pressure, valve mechanism responsive to the sudden reduction in brake pipe pressure for cutting said means out of operation, and valve means operative upon the supplying of fluid under pressure to the straight air pipe for also cutting said means out of operation.

4. In a vehicle brake equipment, in combination, a communication through which fluid under pressure is supplied to effect an application of the brakes, a straight air pipe through which fluid under pressure may be supplied to said communication, a brake pipe, a brake controlling valve device operative upon a gradual reduction in brake pipe pressure for supplying fluid under pressure to said communication and operative upon a sudden reduction in brake pipe pressure for also supplying fluid under pressure to said communication, means operative to limit the pressure of fluid supplied by the brake controlling valve device in response to the gradual reduction in brake pipe pressure, valve mechanism responsive to the sudden reduction in brake pipe pressure for cutting said means out of operation, and valve means separate from said valve mechanism operative when fluid under pressure is supplied through the straight air pipe for also cutting said means out of operation and for admitting fluid under pressure to said communication.

5. In a vehicle brake equipment, in combination, a communication through which fluid under pressure is supplied to effect an application of the brakes, a straight air pipe through which fluid under pressure may be supplied to said communication, a normally charged auxiliary reservoir, a normally charged emergency reservoir, a brake pipe, a brake controlling valve device operative upon a gradual reduction in brake pipe pressure for supplying fluid under pressure from the auxiliary reservoir, means for limiting the pressure of fluid supplied from the auxiliary reservoir to said communication, said brake controlling valve device being operative upon a sudden reduction in brake pipe pressure to supply fluid under pressure from both the auxiliary reservoir and emergency reservoir to said communication and to cut said means out of operation, and means operative when fluid under pressure is supplied to the straight air pipe for also cutting said means out of operation and for admitting fluid under pressure from the straight air pipe to said communication.

6. In a combined automatic and straight air brake equipment, in combination, a communication through which fluid under pressure is supplied in effecting both straight air and automatic applications of the brakes, a straight air pipe through which fluid under pressure may be supplied to said communication to effect a straight air application of the brakes, a brake pipe, a brake controlling valve device operative upon a gradual reduction in brake pipe pressure for supplying fluid under pressure to said communication for effecting an automatic service application of the brakes, means operative in effecting an automatic service application of the brakes to limit the pressure of fluid in said communication, and a valve operative in initiating a straight air application of the brakes for rendering said means ineffective to limit the pressure of fluid in said communication, said brake controlling valve device being operative upon a sudden reduction in brake pipe pressure for supplying fluid under pressure to said communication and for rendering said means ineffective to limit the pressure of fluid in the communication.

7. In a combined automatic and straight air brake equipment, in combination, a communication through which fluid under pressure is supplied in effecting both straight air and automatic applications of the brakes, a straight air pipe through which fluid under pressure may be supplied to said communication to effect a straight air application of the brakes, a brake pipe, a brake controlling valve mechanism operative upon a gradual reduction in brake pipe pressure to supply fluid under pressure to said communication to effect an automatic service application of the brakes and operative upon a sudden reduction in brake pipe pressure to supply fluid under pressure to the communication to effect an automatic emergency application of the brakes, said brake controlling valve device comprising an equalizing valve mechanism and an emergency valve mechanism, means operative to limit the pressure of fluid supplied to said communication by the brake controlling valve device in effecting an automatic service application of the brakes, said emergency valve mechanism being operative upon the sudden reduction in brake pipe pressure to render said means ineffective to limit the pressure of fluid in said communication, and a valve device operative automatically in effecting a straight air application of the brakes for rendering said means ineffective to limit the pressure of fluid in said communication.

8. In a vehicle brake equipment, in combination, a brake application passage through which fluid under pressure is supplied to effect either a straight air or an automatic application of the brakes, a straight air passage through which fluid under pressure may be supplied to said brake application passage, another passage through which fluid under pressure may be supplied to said brake application passage, valve means operative to cut off communication between said other passage and the brake application passage when fluid under pressure is supplied through said straight air passage and operative to cut off communication between the straight air passage and the brake application passage when fluid under pressure is supplied through said other passage, a brake pipe, a brake controlling valve device operative upon a gradual reduction in brake pipe pressure for supplying fluid under pressure to said other passage to effect an automatic service application of the brakes and operative upon a sudden reduction in brake pipe pressure for supplying fluid under pressure to said other passage to effect an emergency application of the brakes, a pressure limiting valve device normally connected to said other passage for limiting the pressure of fluid being supplied to said brake application passage in effecting an automatic service application of the brakes, and valve means included in said brake controlling valve device operative upon the sudden reduction in brake pipe pressure for cutting off communication between said other passage and pressure limiting valve device.

9. In a vehicle brake equipment, in combination, a brake pipe, a brake controlling valve device operable upon a gradual reduction in brake pipe pressure for supplying fluid under pressure to a passage for effecting a service application of the brakes and upon a sudden reduction in brake pipe pressure for supplying fluid under pressure to said passage for effecting an emergency application of the brakes, a straight air pipe, valve means operative upon an increase in fluid pressure in the straight air pipe for cutting off communication through which said brake controlling valve device supplies fluid under pressure to said passage, a pressure limiting valve device for limiting the pressure of fluid supplied by said brake controlling valve device to said passage, and means in said brake controlling valve device operative upon effecting an emergency application of the brakes for rendering said limiting valve device non-operative.

10. In a vehicle brake equipment, in combination, a brake application passage through which fluid under pressure is supplied to effect either a straight air or an automatic application of the brakes, a straight air passage through which fluid under pressure may be supplied to said brake application passage, another passage through which fluid under pressure may be supplied to said brake application passage, valve means operative to cut off communication between said other passage and the brake application passage when fluid under pressure is supplied through said straight air passage and operative to cut off communication between the straight air passage and the brake application passage when fluid under pressure is supplied through said other passage, a brake pipe, a brake controlling valve device operative upon a gradual reduction in brake pipe pressure for supplying fluid under pressure to said other passage to effect an automatic service application of the brakes and operative upon a sudden reduction in brake pipe pressure for supplying fluid under pressure to said other passage to effect an emergency application of the brakes, a pressure limiting valve device normally connected to said other passage for limiting the pressure of fluid being supplied to said brake application passage in effecting an automatic service application of the brakes, a displacement volume chamber connected to said other passage, and means included in said brake controlling valve device operative upon the sudden reduction in brake pipe pressure for cutting off communication between said other passage and pressure limiting valve device.

11. In a vehicle brake equipment, in combination, a brake application passage through which fluid under pressure is supplied to effect either a straight air or an automatic application of the brakes, a straight air passage through which fluid under pressure may be supplied to said brake application passage, another passage through which fluid under pressure may be supplied to said brake application passage, valve means operative to cut off communication between said other passage and the brake application passage when fluid under pressure is supplied through said straight air passage and operative to cut off communication between the straight air passage and the brake application passage when fluid under pressure is supplied through said other passage, a brake pipe, a brake controlling valve device operative upon a gradual reduction in brake pipe pressure for supplying fluid under pressure to said other passage to effect an automatic service application of the brakes and operative upon a sudden reduction in brake pipe pressure for supplying fluid under pressure to said other passage to effect an emergency application of the brakes, a pressure limiting valve device normally connected to said other passage for limiting the pressure of fluid being supplied to said brake application passage in effecting an automatic service application of the brakes, a displacement volume chamber for increasing the volume into which said brake controlling valve device supplies fluid under pressure, and means responsive to the pressure of fluid supplied through the straight air pipe for isolating said volume chamber from said communication.

12. In a vehicle brake equipment, in combination, a brake application passage through which fluid under pressure is supplied to effect either a straight air or an automatic application of the brakes, a straight air passage through which fluid under pressure may be supplied to said brake application passage, another passage through which fluid under pressure may be supplied to said brake application passage, valve means operative to cut off communication between said other passage and the brake application passage when fluid under pressure is supplied through said straight air passage and operative to cut off communication between the straight air passage and the brake application passage when fluid under pressure is supplied through said other passage, a brake pipe, a brake controlling valve device operative upon a gradual reduction in brake pipe pressure for supplying fluid under pressure to said other passage to effect an automatic service application of the brakes and operative upon a sudden reduction in brake pipe pressure for supplying fluid under pressure to said other passage to effect an emergency application of the brakes, a pressure limiting valve device normally connected to said other passage for limiting the pressure of fluid being supplied to said brake application passage in effecting an automatic service application of the brakes, a displacement volume chamber connected to said other passage, and means operative upon the sudden reduction in brake pipe pressure rendering said pressure limiting valve device ineffective to limit the pressure of fluid in the brake application passage.

13. In a fluid pressure brake equipment, in combination, a brake pipe, a brake cylinder, an auxiliary reservoir, a supply reservoir, a brake controlling valve device having a release position for admitting fluid under pressure from the brake pipe to the auxiliary reservoir and for admitting fluid under pressure from the auxiliary reservoir to the supply reservoir, means separate from the brake controlling valve device for regulating the flow of fluid under pressure from the brake pipe to the supply reservoir, valve means operative by fluid under pressure for supplying fluid under pressure from the supply reservoir to said brake cylinder, said brake controlling valve device being operative upon a reduction in brake pipe pressure to cut off the communication between the brake pipe and auxiliary reservoir and between the auxiliary reservoir and supply reservoir and to supply fluid under pressure to effect the operation of said valve means, and means responsive to the pressure of fluid supplied by the brake controlling valve device closing communication between the brake pipe and supply reservoir.

14. In a fluid pressure brake equipment, in combination, a brake pipe, a brake cylinder, an auxiliary reservoir, a supply reservoir, a brake controlling valve device having a release position for admitting fluid under pressure from the brake pipe to the auxiliary reservoir and for admitting fluid under pressure from the auxiliary reservoir to the supply reservoir, means separate from the brake controlling valve device for regulating the flow of fluid under pressure from the brake pipe to the supply reservoir, valve means operative by fluid under pressure for supplying fluid under pressure from the supply reservoir to said brake cylinder, said brake controlling valve device being operative upon a reduction in brake pipe pressure to cut off the communication between the brake pipe and auxiliary reservoir and between the auxiliary reservoir and supply reservoir and to supply fluid under pressure to effect the operation of said valve means, and means responsive to the pressure of fluid supplied by the brake controlling valve device closing communication between the brake pipe and supply reservoir, and for maintaining the communication closed so long as the pressure of fluid supplied by the brake controlling valve device exceeds a predetermined low degree.

15. In a fluid pressure brake equipment, in combination, a brake pipe, a brake cylinder, an auxiliary reservoir, a supply reservoir, valve means operative by fluid under pressure for supplying fluid under pressure from the supply reservoir to the brake cylinder to effect an application of the brakes, a brake controlling valve device operated upon a reduction in brake pipe pressure for supplying fluid under pressure to effect the operation of said valve means, said brake controlling valve device having a release position for establishing a communication through which the auxiliary reservoir is adapted to be charged with fluid under pressure from the brake pipe and for establishing another communication through which fluid under pressure is adapted to flow from the auxiliary reservoir to the supply reservoir, a charging communication separate from the brake controlling valve device through which fluid under pressure is adapted to flow from the brake pipe to the supply reservoir, and means operatitve upon a predetermined increase in the pressure of fluid supplied to said valve means for closing said separate charging communication, the other charging communications being closed by the brake controlling valve device in its operation to brake application position.

16. In a fluid pressure brake equipment, in combination, a brake pipe, a brake cylinder, a supply reservoir, valve means operative by fluid under pressure to supply fluid under pressure from the supply reservoir to the brake cylinder, a communication through which fluid under pressure flows from the brake pipe to said reservoir, a brake controlling valve device operative upon a reduction in brake pipe pressure to supply fluid under pressure to said valve means for effecting the operation of the valve means, and means operative by fluid under pressure supplied by the brake controlling valve device for closing said communication.

17. In a fluid pressure brake equipment, in combination, a brake pipe, a brake cylinder, a supply reservoir, valve means operative by fluid under pressure to supply fluid under pressure from the supply reservoir to the brake cylinder, a communication through which fluid under pressure flows from the brake pipe to said reservoir, a check valve for preventing back flow of fluid from said reservoir, a brake controlling valve device operative upon a reduction in brake pipe pressure to supply fluid under pressure to said valve means for effecting the operation of the valve means, and means operative by fluid under pressure supplied by the brake controlling valve device for closing said communication.

18. In a fluid pressure brake equipment, in combination, a brake pipe, a brake cylinder, a supply reservoir, valve means operative by fluid under pressure to supply fluid under pressure from the supply reservoir to the brake cylinder, a communication through which fluid under pressure flows from the brake pipe to said reservoir, a quick service passage connected to said communication, a brake controlling valve device operative upon a reduction in brake pipe pressure for venting fluid under pressure from said passage and thereby from said communication and brake pipe and for supplying fluid under pressure to said valve means to effect the operation of valve means, and a check valve for preventing back flow of fluid from the supply reservoir to said quick service passage.

19. In a fluid pressure brake equipment, in combination, a brake pipe, a brake cylinder, a supply reservoir, valve means operative by fluid under pressure to supply fluid under pressure from the supply reservoir to the brake cylinder, a communication through which fluid under pressure flows from the brake pipe to said reservoir, a quick service passage connected to said communication, a brake controlling valve device operative upon a reduction in brake pipe pressure for venting fluid under pressure from said passage and thereby from said communication and brake pipe and for supplying fluid under pressure to said valve means to effect the operation of valve means, and means operative to prevent the quick service venting of fluid from reducing the pressure of fluid in the supply reservoir.

20. In a fluid pressure brake equipment, in combination, a brake pipe, a brake cylinder, a supply reservoir, valve means operative by fluid under pressure to supply fluid under pressure from the supply reservoir to the brake cylinder, a communication through which fluid under pressure flows from the brake pipe to said reservoir, a quick service passage connected to said communication, a brake controlling valve device operative upon a reduction in brake pipe pressure for venting fluid under pressure from said passage and thereby from said communication and brake pipe and for supplying fluid under pressure to said valve means to effect the operation of valve means, and means interposed in said communication at a point located between the supply reservoir and the quick service passage for preventing back flow of fluid from the supply reservoir.

21. In a fluid pressure brake equipment, in combination, a brake pipe, a brake cylinder, a supply reservoir, valve means operative by fluid under pressure to supply fluid under pressure from the supply reservoir to the brake cylinder, a communication through which fluid under pressure flows from the brake pipe to said reservoir, a quick service passage connected to said communication, a brake controlling valve device operative upon a reduction in brake pipe pressure for venting fluid under pressure from said passage and thereby from said communication and brake pipe and for supplying fluid under pressure to said valve means to effect the operation of valve means, means preventing back flow of fluid from the supply reservoir to said quick service passage, and means operative upon a predetermined increase in the pressure of fluid supplied by the brake controlling valve device to said valve means for cutting off the quick service flow of fluid from the brake pipe by way of said communication.

22. In a fluid pressure brake equipment, in combination, a brake pipe, a brake cylinder, a supply reservoir, valve means operative by fluid under pressure to supply fluid under pressure from the supply reservoir to the brake cylinder, a communication through which fluid under pressure flows from the brake pipe to said reservoir, a quick service passage connected to said communication, a brake controlling valve device operative upon a reduction in brake pipe pressure for venting fluid under pressure from said passage and thereby from said communication and brake pipe and for supplying fluid under pressure to said valve means to effect the operation of valve means, means interposed in said communication at a point located between the supply reservoir and said passage for preventing back flow of fluid from the supply reservoir, and means interposed in said communication at a point located between said passage and brake pipe operative upon a predetermined increase in the pressure of fluid supplied by the brake controlling valve device for cutting off the quick service flow of fluid from the brake pipe to said passage.

23. In a fluid pressure brake equipment, in combination, a brake pipe, a brake cylinder, a supply reservoir, valve means operative by fluid under pressure to supply fluid under pressure from the supply reservoir to the brake cylinder, a communication through which fluid under pressure flows from the brake pipe to said reservoir, a quick service passage connected to said communication, a vented quick service chamber, a brake controlling valve device operative upon a reduction in brake pipe pressure to first connect said passage to said chamber to effect a local reduction in brake pipe pressure and to then supply fluid under pressure to said valve means to effect an application of the brakes and to connect said passage to the communication through which fluid under pressure is being supplied to the valve means by the brake controlling valve device to effect a further local quick service reduction in brake pipe pressure, and means preventing back flow of fluid from the supply reservoir to said quick service passage.

24. In a fluid pressure brake equipment, in combination, a brake pipe, a brake cylinder, a supply reservoir, valve means operative by fluid under pressure to supply fluid under pressure from the supply reservoir to the brake cylinder, a communication through which fluid under pressure flows from the brake pipe to said reservoir, a quick service passage connected to said communication, a vented quick service chamber, a brake controlling valve device operative upon a reduction in brake pipe pressure to first connect said passage to said chamber to effect a local reduction in brake pipe pressure and to then supply fluid under pressure to said valve means to effect an application of the brakes and to connect said passage to the communication through which fluid under pressure is being supplied to the valve means by the brake controlling valve device to effect a further local quick service reduction in brake pipe pressure, means preventing back flow of fluid from the supply reservoir to the quick service passage, and valve mechanism operative upon a predetermined increase in the pressure of fluid supplied to said valve means to cut off the flow of fluid from the brake pipe to said passage.

25. In a fluid pressure brake equipment, in combination, a brake pipe, a brake cylinder, a supply reservoir, valve means operative by fluid under pressure to supply fluid under pressure from the supply reservoir to the brake cylinder, a communication through which fluid under pressure flows from the brake pipe to said reservoir, a quick service passage connected to said communication, a vented quick service chamber, a brake controlling valve device operative upon a reduction in brake pipe pressure to first connect said passage to said chamber to effect a local reduction in brake pipe pressure and to then supply fluid under pressure to said valve means to effect an application of the brakes and to connect said passage to the communication through which fluid under pressure is being supplied to the valve means by the brake controlling valve device to effect a further local quick service reduction in brake pipe pressure, means preventing back flow of fluid from the supply reservoir to the quick service passage, and valve mechanism operative upon a predetermined increase in the pressure of fluid supplied to said valve means to cut off the flow of fluid from the brake pipe to said passage, said valve mechanism being adapted to remain in its cut-off position so long as the pressure of fluid in said valve means is higher than that required to effect its operation to the cut-off position.

26. In a fluid pressure brake equipment, in combination, a brake pipe, a brake cylinder, an auxiliary reservoir, a supply reservoir, valve means operative by fluid under pressure to supply fluid under pressure from the supply reservoir to the brake cylinder, a brake controlling valve device operative upon a reduction in brake pipe pressure for supplying fluid under pressure from the auxiliary reservoir to effect the operation of said valve means, said brake controlling valve device in its release position establishing a charging communication through which fluid under pressure is adapted to flow at a restricted rate from the brake pipe to the auxiliary reservoir and from thence to the supply reservoir, another charging communication through which fluid under pressure is adapted to flow from the brake pipe to the supply reservoir at a less restricted rate, a valve normally closing said other charging communication and operative only when brake pipe pressure exceeds auxiliary reservoir pressure by a predetermined degree for permitting flow of fluid to the supply reservoir, and a check valve for preventing flow of fluid from the supply reservoir to auxiliary reservoir.

27. In a fluid pressure brake equipment, in combination, a brake pipe, a brake cylinder, an auxiliary reservoir, a supply reservoir, valve means operative by fluid under pressure to supply fluid under pressure from the supply reservoir to the brake cylinder, a communication through which fluid under pressure, in initially charging the equipment, flows from the brake pipe to the supply reservoir, a valve operative upon a predetermined increase in supply reservoir pressure to cut off the flow of fluid through the communication, a triple valve device having a release position in which it establishes a restricted communication through which fluid under pressure is adapted to flow from the brake pipe to the supply reservoir, and a valve preventing back flow from the supply reservoir to the triple valve device and operative when the pressure of fluid in the communication established by the triple valve device exceeds the pressure of fluid in the supply reservoir by a predetermined degree for permitting the flow of fluid from the brake pipe to the supply reservoir to charge the reservoir to the brake pipe pressure carried.

28. In a fluid pressure brake equipment, in combination, a brake pipe, a brake cylinder, an auxiliary reservoir, a supply reservoir, valve means operative by fluid under pressure to supply fluid under pressure from the supply reservoir to the brake cylinder, a communication through which fluid under pressure, in initially charging the equipment, flows from the brake pipe to the supply reservoir, a valve operative upon a predetermined increase in supply reservoir pressure to cut off the flow of fluid through the communication, a brake controlling valve device having a release position and adapted in this position to establish a restricted communication through which fluid under pressure is adapted to flow from the brake pipe to the supply reservoir, a valve interposed in said restricted communication subject on one side to the pressure of fluid flowing through the restricted communication and on the other side to the pressure of fluid being supplied to said reservoir and operative to prevent the flow of fluid through the restricted communication to the supply reservoir until the pressure of fluid in the restricted communication exceeds the pressure of fluid supplied to the supply reservoir by way of the other communication.

29. In a fluid pressure brake equipment, in combination, a brake pipe, a brake cylinder, an auxiliary reservoir, a supply reservoir, valve means operative by fluid under pressure to supply fluid under pressure from the supply reservoir to the brake cylinder, a restricted communication through which fluid under pressure, in initially charging the equipment is supplied from the brake pipe to the supply reservoir, another but more restricted communication through which fluid under pressure is adapted to flow from the brake pipe to the supply reservoir, a valve operative to cut off the flow of fluid through the first mentioned communication before the supply reservoir is fully charged, and a valve subject to the pressure of fluid being supplied to the supply reservoir for preventing flow of fluid through the other more restricted communication and operative when the pressure of fluid in the more restricted communication exceeds the pressure of fluid in the supply reservoir to permit fluid under pressure to flow to the supply reservoir to fully charge the reservoir.

30. In a fluid pressure brake, in combination, a brake pipe, an auxiliary reservoir charged with fluid under pressure from the brake pipe, a supply reservoir charged with fluid under pressure from the auxiliary reservoir, a brake controlling valve device having a release position in which a communication is established through which fluid under pressure flows from the brake pipe to the auxiliary reservoir and in which another communication is established through which fluid under pressure flows from the auxiliary reservoir to the supply reservoir, and a check valve interposed in said other communication preventing the back flow of fluid from the supply reservoir, said brake controlling valve device having a brake applying position in which fluid under pressure is supplied from the supply reservoir to effect an application of the brakes and in which the flow of fluid through both communications is cut off and said other communication is connected to the atmosphere.

31. In a fluid pressure brake, in combination, a brake pipe, an auxiliary reservoir, a brake controlling valve device having a release position in which fluid under pressure flows from the brake pipe to the auxiliary reservoir, a supply reservoir, a charging passage for said supply reservoir, a communication established by said brake controlling valve device in its release position through which fluid under pressure flows from the auxiliary reservoir to said charging passage and thereby to the supply reservoir, means for preventing back flow of fluid from said passage, means operative by fluid under pressure for supplying fluid under pressure from the supply reservoir to effect an application of the brakes, said brake controlling valve device being operative upon a reduction in brake pipe pressure to brake applying position to supply fluid under pressure to effect the operation of said means, and means included in said brake controlling valve device adapted in the brake applying position of the device to connect said passage to the atmosphere.

32. In a fluid pressure brake, in combination, a brake pipe, an auxiliary reservoir, a brake controlling valve device having a release position in which fluid under pressure flows from the brake pipe to the auxiliary reservoir, a supply reservoir, a charging passage for said supply reservoir, a communication established by said brake controlling valve device in its release position through which fluid under pressure flows from the auxiliary reservoir to said charging passage and thereby to the supply reservoir, means for preventing back flow of fluid from said passage, means operative by fluid under pressure for supplying fluid under pressure from the supply reservoir to effect an application of the brakes, said brake controlling valve device being operative upon a reduction in brake pipe pressure to brake applying position to cut off the flow of fluid from the brake pipe to the auxiliary reservoir and to supply fluid under pressure to effect the operation of said means, and means included in said brake controlling valve device adapted in the brake applying position of the device to close the communication from the auxiliary reservoir to the supply reservoir and for connecting said passage to the atmosphere.

33. In a fluid pressure brake, in combination, a brake pipe, an auxiliary reservoir, a brake controlling valve device having a release position in which fluid under pressure flows from the brake pipe to the auxiliary reservoir, a supply reservoir, a charging passage for said supply reservoir, a communication established by said brake controlling valve device in its release position through which fluid under pressure flows from the auxiliary reservoir to said charging passage and thereby to the supply reservoir, valve means interposed in said passage between the supply reservoir and the auxiliary reservoir for preventing back flow of fluid from the supply reservoir, means operative by fluid under pressure for supplying fluid under pressure from the supply reservoir to effect an application of the brakes, said brake controlling valve device being operative upon a reduction in brake pipe pressure to brake applying position to cut off the flow of fluid from the brake pipe to the auxiliary reservoir and to supply fluid under pressure to effect the operation of said means, and a valve included in the brake controlling valve device and disposed between said valve means and auxiliary reservoir, and operative upon movement of the brake controlling valve device toward brake applying position to first cut off the connection from the auxiliary reservoir to said passage and to then connect the passage to the atmosphere.

34. In a vehicle brake equipment, in combination, a brake controlling passage through which fluid under pressure is supplied to effect an application of the brakes, a straight air pipe from which fluid under pressure is adapted to be supplied to said passage to effect a straight air application of the brakes, another passage through which fluid under pressure is adapted to be supplied to said brake controlling passage to effect an application of the brakes, a valve operative by fluid under pressure supplied to the straight air pipe in initiating a straight air application of the brakes for cutting off communication between the brake controlling passage and said other passage, a brake pipe, a brake controlling valve operative upon a reduction in brake pipe pressure from a release position to an application position for supplying fluid under pressure through said other passage to the brake controlling passage, said valve being operative by fluid under pressure from said other passage for cutting off communication between the straight air pipe and the brake controlling passage, and means operative in the release position of said brake controlling valve device for connecting said passage to the atmosphere to prevent fluid under pressure which may leak past said valve to said other passage when a straight air application of the brakes is being effected from being trapped in the passage.

35. In a combined straight air and automatic brake equipment, in combination, a brake application and release pipe through which fluid under pressure is adapted to be supplied to effect an application of the brakes and through which fluid under pressure is adapted to be vented to effect a release of the brakes, a straight air pipe through which fluid under pressure is adapted to be supplied to and released from said passage in effecting the straight air control of the brakes, a conduit through which fluid under pressure is adapted to be supplied to and released from said passage in effecting the automatic control of the brakes, means for cutting off communication between the application and release pipe and said conduit when the brakes are being controlled by straight air and for cutting off communication between the brake application and release pipe from the straight air pipe when the brakes are being automatically controlled, a brake pipe, a brake controlling valve operative upon a reduction in brake pipe pressure to supply fluid under pressure to said communication to effect an automatic application of the brakes and operative upon a subsequent increase in brake pipe pressure to vent fluid under pressure from said communication to effect an automatic release of the brakes, said brake controlling valve device being maintained in its release position during the straight air control of the brakes, and means included in said brake controlling valve device adapted in the release position of the device to connect said communication to the atmosphere.

36. In a combined straight air and automatic brake equipment, in combination, a brake application and release pipe through which fluid under pressure is adapted to be supplied to effect an application of the brakes and through which fluid under pressure is adapted to be vented to effect a release of the brakes, a straight air pipe through which fluid under pressure is adapted to be supplied to and released from said passage in effecting the straight air control of the brakes, a conduit through which fluid under pressure is adapted to be supplied to and released from said passage in effecting the automatic control of the brakes, means for cutting off communication between the application and release pipe and said conduit when the brakes are being controlled by straight air and for cutting off communication between the brake application and release pipe from the straight air pipe when the brakes are being automatically controlled, and a brake controlling valve device operative to control the supply of fluid under pressure to and the release of fluid under pressure from said communication, said brake controlling valve device, when the brakes are being controlled by straight air, maintaining said communication connected to the atmosphere.

37. In a combined straight air and automatic brake equipment, in combination, a brake application and release pipe through which fluid under pressure is adapted to be supplied to effect an application of the brakes and through which fluid under pressure is adapted to be vented to effect a release of the brakes, a straight air pipe through which fluid under pressure is adapted to be supplied to and released from said passage in effecting the straight air control of the brakes, a conduit through which fluid under pressure is adapted to be supplied to and released from said passage in effecting the automatic control of the brakes, means for cutting off communication between the application and release pipe and said conduit when the brakes are being controlled by straight air and for cutting off communication between the brake application and release pipe from the straight air pipe when the brakes are being automatically controlled, a brake controlling valve device operative to control the supply of fluid under pressure to and the release of fluid under pressure from said communication and having a release position in which it remains when the brakes are being controlled by straight air, and venting means included in the brake controlling valve device for preventing fluid under pressure which may leak past said means from the straight air pipe to said communication during a straight air application of the brakes from increasing the pressure of fluid in the communication.

38. In a fluid pressure brake equipment, in combination, a brake pipe, valve means for controlling the application of the brakes and the subsequent release thereof, said valve means comprising an equalizing valve device operated upon a reduction in brake pipe pressure to supply fluid under pressure to effect an application of the brakes and also comprising a release valve device normally establishing a brake release communication and operative upon movement of the equalizing valve device to application position for closing said communication, said equalizing valve device being operative upon an increase in brake pipe pressure to release position to effect the operation of said valve means to again establish said release communication, and means operative separately from said equalizing valve device and release valve device when the application of the brakes is being effected for rendering said valve means effective to open and close said release communication upon movement of the equalizing valve device back and forth between positions short of application position.

39. In a fluid pressure brake equipment, in combination, a brake pipe, a brake controlling valve device for controlling the application of the brakes and the subsequent release thereof, said brake controlling valve device comprising an equalizing valve device operated upon a reduction in brake pipe pressure to supply fluid under pressure to effect an application of the brakes and also comprising a release valve device normally establishing a brake release communication and operative upon movement of the equalizing valve device to application position for closing said communication, said equalizing valve device being operative upon an increase in brake pipe pressure to release position to effect the operation of said release valve device to again establish said release communication, and operative alternatively to release lap and release position upon increasing brake pipe pressure in steps or increments to graduate the release of the brakes, and means operative separately from said equalizing valve device and release valve device when the application of the brakes is being effected for rendering said release valve device responsive to the movement of the equalizing valve device to release and release lap position to open and close said release communication.

40. In a fluid pressure brake equipment, in combination, a brake pipe, a brake controlling valve device for controlling the application of the brakes and the subsequent release thereof, said brake controlling valve device comprising an equalizing valve device operated upon a reduction in brake pipe pressure to supply fluid under pressure to effect an application of the brakes and also comprising a release valve device normally establishing a brake release communication, and means separately from the equalizing valve device and release valve device for insuring against movement of said release valve device to close the relase communication before the equalizing valve device moves to application position and operative by fluid under pressure supplied by the equalizing valve device for conditioning the release valve device for movement to open and close said communication in response to movement of the equalizing valve device alternately to release and a release lap position.

41. In a fluid pressure brake equipment, in combination, a brake pipe, a brake controlling valve device for controlling the application and graduated release of the brakes, said brake controlling valve device comprising a release control valve device normally establishing a brake release communication and also comprising an equalizing valve device operative upon a reduction in brake pipe pressure for supplying fluid under pressure to effect an application of the brakes and to cause said release control valve device to operate to close the brake release communication, said brake controlling valve device being operative alternately to release position and a release lap position upon increasing the brake pipe pressure in steps or increments, and means separate from said equalizing valve device and release control valve device for preventing the operation of said release control valve device to close said brake release communication upon movement of the equalizing valve device to release lap position prior to the equalizing valve device being moved to application position.

42. In a fluid pressure brake equipment, in combination, a brake pipe, a brake controlling valve device for controlling the application and graduated release of the brakes, said brake controlling valve device comprising a release control valve device normally establishing a brake release communication and also comprising an equalizing valve device operative upon a reduction in brake pipe pressure for supplying fluid under pressure to effect an application of the brakes and to cause said release control valve device to operate to close the brake release communication, said brake controlling valve device being operative alternately to release position and a release lap position upon increasing the brake pipe pressure in steps or increments, and means separate from the equalizing valve device for preventing the operation of said release control valve device to close said brake release communication upon movement of the equalizing valve device to release lap position prior to the equalizing valve device being moved to application position, said means being operative upon a predetermined increase in the pressure of fluid being supplied by the equalizing valve device in effecting an application of the brakes for rendering said release control valve device effective to close said communication upon movement of the equalizing valve device to release lap position in graduating the release of the brakes.

43. In a combined automatic and straight air brake equipment, in combination, a passage to which fluid under pressure is adapted to be supplied in effecting both straight air and automatic applications of the brakes and from which fluid under pressure is adapted to be vented in effecting both straight air and automatic releases of the brakes, a straight air pipe through which fluid is adapted to be supplied to said passage to effect a straight air application of the brakes, another passage through which fluid under pressure is adapted to be supplied to the application and release passage to effect an automatic application of the brakes, a valve operative when a straight air application of the brakes is being effected for cutting off communication between said passages, a brake pipe, a brake controlling valve device operative upon a reduction in brake pipe pressure for supplying fluid under pressure to said other passage to effect an automatic application of the brakes and operative upon increasing the pressure of fluid in the brake pipe in steps or increments following the automatic application to graduate the release of the brakes, said brake controlling valve device comprising an equalizing valve device movable alternately to release and release lap position upon the incremental increase in brake pipe pressure to graduate the release of an automatic application of the brakes and also comprising a valve device operative in the release position of the equalizing valve device to connect said other passage to the atmosphere and operative upon movement of the equalizing valve device to release lap position to disconnect said other passage from the atmosphere, and means for preventing the operation of said valve device to disconnect said other passage from the atmosphere when in effecting a straight air application of the brakes the equalizing valve device accidentally assumes release lap position.

44. In a fluid pressure brake equipment, in combination, a brake pipe, a passage through which fluid under pressure is adapted to be supplied to effect an application of the brakes and through which fluid under pressure is adapted to be vented to effect the release of the brakes, a release control valve device normally connecting said passage to the atmosphere, in equalizing valve device operative upon a reduction in brake pipe pressure to application position to effect the operation of said release control valve device to close communication between said passage and the atmosphere and to supply fluid under pressure to said passage, and operative in response to step increases in brake pipe pressure alternately to release position and release lap position to effect the operation of said release control valve device to alternately open and close communication between said passage and the atmosphere to graduate the release of the brakes, and a relay release interlock valve device preventing said release control valve device from operating to close the communication from said passage to the atmosphere upon the initial movement of the equalizing valve device through release lap position in its traverse toward application position.

45. In a fluid pressure brake equipment, in combination, a brake pipe, a passage through which fluid under pressure is adapted to be supplied to effect an application of the brakes and through which fluid under pressure is adapted to be vented to effect the release of the brakes, a release control valve device normally connecting said passage to the atmosphere, an equalizing valve device operative upon a reduction in brake pipe pressure to application position to effect the operation of said release control valve device to close communication between said passage and the atmosphere and to supply fluid under pressure to said passage, and operative in response to step increases in brake pipe pressure alternately to release position and release lap position to effect the operation of said release control valve device to alternately open and close communication between said passage and the atmosphere to graduate the release of the brakes, and a relay release interlock valve device preventing said release control valve device from operating to close the communication from said passage to the atmosphere unless said passage is charged with fluid under pressure.

46. In a fluid pressure brake equipment, in combination, a brake pipe, a passage through which fluid under pressure is adapted to be supplied to effect an application of the brakes and through which fluid under pressure is adapted to be vented to effect the release of the brakes, a release control valve device normally connecting said passage to the atmosphere, an equalizing valve device operative upon a reduction in brake pipe pressure to application position to effect the operation of said release control valve device to close communication between said passage and the atmosphere and to supply fluid under pressure to said passage, and operative in response to step increases in brake pipe pressure alternately to release position and release lap position to effect the operation of said release control valve device to alternately open and close communication between said passage and the atmosphere to graduate the release of the brakes, and a relay release interlock valve device preventing said release control valve device from operating to close the communication from said passage to the atmosphere upon the initial movement of the equalizing valve device through release lap position in its traverse toward application position, said relay release interlocking valve device being operative upon an increase in the pressure of fluid in said passage for rendering said release control valve device operative to close said communication in the release lap position of the equalizing valve device in graduating the release of the brakes.

47. In a fluid pressure brake equipment, in combination, a brake pipe, a passage through which fluid under pressure is adapted to be supplied to effect an application of the brakes and through which fluid under pressure is adapted to be vented to effect the release of the brakes, a release control valve device normally connecting said passage to the atmosphere, an equalizing valve device operative upon a reduction in brake pipe pressure to application position to effect the operation of said release control valve device to close communication between said passage and the atmosphere and to supply fluid under pressure to said passage, and operative in response to step increases in brake pipe pressure alternately to release position and release lap position to effect the operation of said release control valve device to alternately open and close communication between said passage and the atmosphere to graduate the release of the brakes, and a relay release interlock valve device preventing said release control valve device from operating to close the communication from said passage to the atmosphere upon the initial movement of the equalizing valve device through release lap position in its traverse toward application position, and operative only when an application of the brakes has been effected for rendering said release control valve device operative to close said communication in response to movement of the equalizing valve device to release lap position in graduating the release of the brakes.

48. In a fluid pressure brake equipment, in combination, a brake pipe, a passage through which fluid under pressure is adapted to be supplied to effect an application of the brakes and through which fluid under pressure is adapted to be vented to effect the release of the brakes, a release control valve device normally connecting said passage to the atmosphere, an equalizing valve device operative upon a reduction in brake pipe pressure to application position to effect the operation of said release control valve device to close communication between said passage and the atmosphere and to supply fluid under pressure to said passage, and operative in response to step increases in brake pipe pressure alternately to release position and release lap position to effect the operation of said release control valve device to alternately open and close communication between said passage and the atmosphere to graduate the release of the brakes, and a relay release interlock valve device preventing said release control valve device from operating to close the communication from said passage to the atmosphere in release lap position unless the equalizing valve device has been previously moved to application position.

49. In a fluid pressure brake equipment, in combination, a brake pipe, a passage through which fluid under pressure is adapted to be supplied to effect an application of the brakes and through which fluid under pressure is adapted to be vented to effect the release of the brakes, a release control valve device normally connecting said passage to the atmosphere, an equalizing valve device operative upon a reduction in brake pipe pressure to application position to effect the operation of said release control valve device to close communication between said passage and the atmosphere and to supply fluid under pressure to said passage, and operative in response to step increases in brake pipe pressure alternately to release position and release lap position to effect the operation of said release control valve device to alternately open and close communication between said passage and the atmosphere to graduate the release of the brakes, and a relay release interlock valve device preventing said release control valve device from operating to close the communication from said passage to the atmosphere when the equalizing valve device operates to release lap position without having first been operated to application position.

50. In a fluid pressure brake, in combination, a brake pipe, an auxiliary reservoir, a brake controlling valve device operated by variations in brake pipe pressure for effecting the application and release of the brakes, said brake controlling valve device comprising a piston subject to the opposing pressures of the brake pipe and auxiliary reservoir, means including a slide valve and a release control valve device controlled by said piston for effecting a graduated release of the brakes, and means separate from said slide valve and release control valve device for normally rendering the graduating means ineffective and for rendering the graduated release means effective upon the effecting of an application of the brakes.

51. In a fluid pressure brake, in combination, a brake pipe, an auxiliary reservoir, a brake controlling valve device operated by variations in brake pipe pressure for effecting the application and release of the brakes, said brake controlling valve device comprising a piston subject to the opposing pressures of the brake pipe and auxiliary reservoir, means controlled by said piston for effecting a graduated release of the brakes, and valve means normally rendering the graduated release means ineffective and operative by fluid under pressure supplied by the brake controlling valve device in effecting an application of the brakes to render the graduated release means effective upon subsequently increasing brake pipe pressure in steps or increments.

52. In a fluid pressure brake, in combination, a brake pipe, an auxiliary reservoir, a brake controlling valve device operated by variations in brake pipe pressure for effecting the application and release of the brakes, said brake controlling valve device comprising a piston subject to the opposing pressures of the brake pipe and auxiliary reservoir, means controlled by said piston for effecting a graduated release of the brakes, and valve means normally rendering the graduated release means ineffective and operative by fluid under pressure supplied by the brake controlling valve device in effecting an application of the brakes to condition the graduated release means for operation to graduate the release of the brakes.

53. In a fluid pressure brake, in combination, a brake pipe, an auxiliary reservoir, a brake controlling valve device operative upon a reduction in brake pipe pressure for supplying fluid under pressure from the auxiliary reservoir to effect an application of the brakes and operative upon a subsequent increase in brake pipe pressure to effect the release of the brakes, an emergency reservoir, a charging communication through which fluid under pressure is adapted to flow from the auxiliary reservoir to the emergency reservoir with the brake controlling valve device in release position, another charging communication through which fluid under pressure is adapted to flow from the emergency reservoir to the auxiliary reservoir upon operation of the brake controlling valve device to release position following an application of the brakes, and means normally closing said other communication and operative separately from the brake controlling valve device to open the communication to the brake controlling valve device upon the effecting of an application of the brakes.

54. In a fluid pressure brake, in combination, a brake pipe, an auxiliary reservoir, a brake controlling valve device operative upon a reduction in brake pipe pressure for supplying fluid under pressure from the auxiliary reservoir to effect an application of the brakes and operative upon a subsequent increase in brake pipe pressure to effect the release of the brakes, an emergency reservoir, a charging communication through which fluid under pressure is adapted to flow from the auxiliary reservoir to the emergency reservoir with the brake controlling valve device in release position, another charging communication through which fluid under pressure is adapted to flow from the emergency reservoir to the auxiliary reservoir upon operation of the brake controlling valve device to release position following an application of the brakes, means normally closing said other communication and operative to open the communication to the brake controlling valve device upon the effecting of an application of the brakes, and a valve for preventing back flow of fluid from the emergency reservoir to the auxiliary reservoir through the first mentioned charging communication.

55. In a fluid pressure brake, in combination, a brake pipe, an auxiliary reservoir, an emergency reservoir, an equalizing valve mechanism operative upon a reduction in brake pipe pressure to supply fluid under pressure from the auxiliary reservoir to effect an application of the brakes and operative upon an increase in brake pipe pressure to effect the release of the brakes, said equalizing valve device in release position establishing a charging communication through which fluid under pressure flows from the brake pipe to the auxiliary reservoir and also establishing another communication through which fluid under pressure is adapted to flow from the auxiliary reservoir to the emergency reservoir when the pressure of fluid in the emergency reservoir does not exceed the pressure of fluid in the auxiliary reservoir, means preventing back flow of fluid from the emergency reservoir, and valve means operative upon the effecting of an application of the brakes to establish a by-pass charging communication around said means to permit the flow of fluid from the emergency reservoir to the auxiliary reservoir in releasing the brakes.

56. In a fluid pressure brake, in combination, a brake pipe, an auxiliary reservoir, an emergency reservoir, an equalizing valve mechanism operative upon a reduction in brake pipe pressure to supply fluid under pressure from the auxiliary reservoir to effect an application of the brakes and operative upon an increase in brake pipe pressure to effect the release of the brakes, said equalizing valve device in release position establishing a charging communication through which fluid under pressure flows from the brake pipe to the auxiliary reservoir and also establishing another communication through which fluid under pressure is adapted to flow from the auxiliary reservoir to the emergency reservoir when the pressure of fluid in the emergency reservoir does not exceed the pressure of fluid in the auxiliary reservoir, means preventing back flow of fluid from the emergency reservoir, and valve means operative upon the effecting of an application of the brakes to establish a by-pass charging communication around said means to permit the flow of fluid from the emergency reservoir to the auxiliary reservoir in releasing the brakes, and operative when the brakes have been partially released for closing the by-pass charging communication.

57. In a fluid pressure brake, in combination, a brake pipe, an auxiliary reservoir, an emergency reservoir, an equalizing valve mechanism operative upon a reduction in brake pipe pressure to supply fluid under pressure from the auxiliary reservoir to effect an application of the brakes and operative upon an increase in brake pipe pressure to effect the release of the brakes, said equalizing valve device in release position establishing a charging communication through which fluid under pressure flows from the brake pipe to the auxiliary reservoir and also establishing another communication through which fluid under pressure is adapted to flow from the auxiliary reservoir to the emergency reservoir when the pressure of fluid in the emergency reservoir does not exceed the pressure of fluid in the auxiliary reservoir, means preventing back flow of fluid from the emergency reservoir, and valve means operative upon the effecting of an application of the brakes to establish a by-pass charging communication around said means to permit the flow of fluid from the emergency reservoir to the auxiliary reservoir in releasing the brakes, and operative automatically upon the release of the brakes to a predetermined low degree for closing the by-pass communication.

58. In a fluid pressure brake, in combination, a brake pipe, an auxiliary reservoir, an emergency reservoir, an equalizing valve mechanism operative upon a reduction in brake pipe pressure to supply fluid under pressure from the auxiliary reservoir to effect an application of the brakes and operative upon an increase in brake pipe pressure to effect the release of the brakes, said equalizing valve device in release position establishing a charging communication through which fluid under pressure flows from the brake pipe to the auxiliary reservoir and also establishing another communication through which fluid under pressure is adapted to flow from the auxiliary reservoir to the emergency reservoir when the pressure of fluid in the emergency reservoir does not exceed the pressure of fluid in the auxiliary reservoir, means preventing back flow of fluid from the emergency reservoir, and valve means operative upon the effecting of an application of the brakes to establish a by-pass charging communication around said means to permit the flow of fluid from the emergency reservoir to the auxiliary reservoir in releasing the brakes, and operative when the brakes have been released to a degree when, in graduating the release of the brakes, no further graduations are necessary.

59. In a fluid pressure brake, in combination, a brake pipe, an auxiliary reservoir, an emergency reservoir, an equalizing valve mechanism operative upon a reduction in brake pipe pressure to supply fluid under pressure from the auxiliary reservoir to effect an application of the brakes and operative upon an increase in brake pipe pressure to effect the release of the brakes, said equalizing valve device in release position establishing a charging communication through which fluid under pressure flows from the brake pipe to the auxiliary reservoir and also establishing another communication through which fluid under pressure is adapted to flow from the auxiliary reservoir to the emergency reservoir when the pressure of fluid in the emergency reservoir does not exceed the pressure of fluid in the auxiliary reservoir, means preventing back flow of fluid from the emergency reservoir, and valve means operative upon the effecting of an application of the brakes to establish a by-pass charging communication around said means to permit the flow of fluid from the emergency reservoir to the auxiliary reservoir in releasing the brakes, and means interposed in said by-pass communication for restricting the rate of flow of fluid therethrough.

60. In a fluid pressure brake, in combination, a brake pipe, an auxiliary reservoir, a brake controlling valve device operated upon a reduction in brake pipe pressure for supplying fluid under pressure from the auxiliary reservoir to a chamber, an emergency reservoir, and a valve mechanism operated upon a predetermined increase in the pressure of fluid supplied to said chamber for opening a communication through which fluid under pressure may flow from the emergency reservoir to the auxiliary reservoir.

61. In a fluid pressure brake, in combination, a brake pipe, an auxiliary reservoir, a brake controlling valve device operated upon a reduction in brake pipe pressure for supplying fluid under pressure from the auxiliary reservoir to a chamber, an emergency reservoir, a valve mechanism operated upon a predetermined increase in the pressure of fluid supplied to said chamber for opening a communication through which fluid under pressure may flow from the emergency reservoir to the auxiliary reservoir, means included in the brake controlling valve device adapted upon movement of the brake controlling valve device in response to a brake pipe reduction for preventing flow of fluid through said communication.

62. In a fluid pressure brake, in combination, a brake pipe, an auxiliary reservoir, a chamber in which an increase in pressure effects an application of the brakes and in which a decrease in pressure effects the release of the brakes, a brake controlling valve device operated upon a reduction in brake pipe pressure for supplying fluid under pressure to said chamber to effect an application of the brakes and operative upon an increase in brake pipe pressure to release fluid under pressure from said chamber to effect the release of the brakes, and a valve mechanism operated upon a predetermined increase in the pressure of fluid in the chamber for opening a communication through which fluid under pressure may flow from the emergency reservoir to the auxiliary reservoir, and means adapted in the brake applying position of the brake controlling valve device to prevent the flow of fluid from the emergency reservoir to the auxiliary reservoir and in the brake releasing position of the brake controlling valve device to permit the flow of fluid from the emergency reservoir to the auxiliary reservoir.

63. In a fluid pressure brake, in combination, a brake pipe, an auxiliary reservoir, a chamber in which an increase in pressure effects an application of the brakes and in which a decrease in pressure effects the release of the brakes, a brake controlling valve device operated upon a reduction in brake pipe pressure for supplying fluid under pressure to said chamber to effect an application of the brakes and operative upon an increase in brake pipe pressure to release fluid under pressure from said chamber to effect the release of the brakes, and a valve mechanism operated upon a predetermined increase in the pressure of fluid in the chamber for opening a communication through which fluid under pressure may flow from the emergency reservoir to the auxiliary reservoir, and means included in the brake controlling valve device operative in effecting an application of the brakes to close said communication and operative in effecting the release of the brakes to open said communication.

64. In a fluid pressure brake, in combination, a brake pipe, an auxiliary reservoir, a chamber in which an increase in pressure effects an application of the brakes and in which a decrease in pressure effects the release of the brakes, a brake controlling valve device operated upon a reduction in brake pipe pressure for supplying fluid under pressure to said chamber to effect an application of the brakes and operative upon an increase in brake pipe pressure to release fluid under pressure from said chamber to effect the release of the brakes, and a valve mechanism operated upon a predetermined increase in the pressure of fluid in the chamber for opening a communication through which fluid under pressure may flow from the emergency reservoir to the auxiliary reservoir, and means included in the brake controlling valve device for controlling said communication to prevent the flow of fluid through the communication when an application of the brakes is being effected and to permit such flow when a release of the brakes is being effected.

65. In a fluid pressure brake, in combination, a brake pipe, an auxiliary reservoir, a chamber in which an increase in pressure effects an application of the brakes and in which a decrease in pressure effects the release of the brakes, a brake controlling valve device operated upon a reduction in brake pipe pressure for supplying fluid under pressure to said chamber to effect an application of the brakes and operative upon an increase in brake pipe pressure to release fluid under pressure from said chamber to effect the release of the brakes, and a valve mechanism operated upon a predetermined increase in the pressure of fluid in the chamber for opening a communication through which fluid under pressure may flow from the emergency reservoir to the auxiliary reservoir, and means included in the brake controlling valve device for controlling said communication to prevent the flow of fluid through the communication when an application of the brakes is being effected and to permit such flow when a release of the brakes is being effected, said valve mechanism being responsive to a predetermined reduction in the pressure of fluid in said chamber for closing said communication.

66. In a fluid pressure brake, in combination, a brake pipe, an auxiliary reservoir, a chamber in which an increase in pressure effects an application of the brakes and in which a decrease in pressure effects the release of the brakes, a brake controlling valve device operated upon a reduction in brake pipe pressure for supplying fluid under pressure to said chamber to effect an application of the brakes and operative upon an increase in brake pipe pressure to release fluid under pressure from said chamber to effect the release of the brakes, and a valve mechanism operated upon a predetermined increase in the pressure of fluid in the chamber for opening a communication through which fluid under pressure may flow from the emergency reservoir to the auxiliary reservoir, and means included in the brake controlling valve device for controlling said communication to prevent the flow of fluid through the communication when an application of the brakes is being effected and to permit such flow when a release of the brakes is being effected, and to open a communication through which fluid under pressure may flow from the auxiliary reservoir to the emergency reservoir.

67. In a vehicle brake equipment, in combination, a brake pipe, a relay valve device operated upon an increase in fluid pressure in a chamber for supplying fluid under pressure to effect an application of the brakes and operated upon a decrease in the pressure of fluid in said chamber for effecting the release of the brakes, an emergency reservoir, a valve mechanism operated upon a predetermined increase in the pressure of fluid supplied to said chamber for establishing a communication through which fluid under pressure may flow from the emergency reservoir to the auxiliary reservoir and a release valve device for controlling the release of fluid from said chamber and for controlling said communication, and a brake controlling valve device operated upon a reduction in brake pipe pressure for supplying fluid under pressure to said chamber and for effecting the operation of said release valve device to close said communication and operated upon an increase in brake pipe pressure to effect the operation of the release valve device to release fluid under pressure from said chamber and to open said communication.

68. In a vehicle brake equipment, in combination, a brake pipe, a supply reservoir, a relay valve device operated upon an increase in fluid pressure in a chamber for supplying fluid from the supply reservoir to effect an application of the brakes, a release valve device for controlling the release of fluid from said chamber and a communication through which said reservoir is charged with fluid under pressure, and a brake controlling valve device operated upon a reduction in brake pipe pressure for supplying fluid to said chamber and for effecting the operation of said release valve device to close said communication.

69. In a combined automatic and straight air brake equipment, a normally charged brake pipe, a normally charged auxiliary reservoir, a normally charged supply reservoir, valve means operative by fluid under pressure from said supply reservoir to effect an application of the brakes, a brake application passage through which fluid under pressure is adapted to be supplied to effect either an automatic or a straight air application of the brakes, a straight air pipe through which fluid under pressure is supplied to said passage to effect a straight air application of the brakes, another passage through which fluid under pressure is adapted to be supplied to effect an automatic application of the brakes, a brake controlling valve device subject to the opposing pressures of the brake pipe and auxiliary reservoir and operated upon a reduction in brake pipe pressure for supplying fluid under pressure to said other passage, valve means closing communication between the brake application pipe and said other passage, and means included in said brake controlling valve device establishing communication through which fluid under pressure is vented from the auxiliary reservoir to said supply reservoir during the straight air application of the brakes.

70. In a combined automatic and straight air brake equipment, a normally charged brake pipe, a normally charged auxiliary reservoir, a normally charged supply reservoir, valve means operative by fluid under pressure from said supply reservoir to effect an application of the brakes, a brake application passage through which fluid under pressure is adapted to be supplied to effect either an automatic or a straight air application of the brakes, a straight air pipe through which fluid under pressure is supplied to said passage to effect a straight air application of the brakes, another passage through which fluid under pressure is adapted to be supplied to effect an automatic application of the brakes, a brake controlling valve device subject to the opposing pressures of the brake pipe and auxiliary reservoir and operated upon a reduction in brake pipe pressure for supplying fluid under pressure to said other passage, valve means closing communication between the brake application pipe and said other passage, means included in said brake controlling valve device establishing communication through which fluid under pressure is vented from the auxiliary reservoir to said supply reservoir during the straight air application of the brakes, and a check valve for preventing back flow of fluid from the supply reservoir to the auxiliary reservoir.

71. In a combined automatic and straight air brake equipment, a normally charged brake pipe, a normally charged auxiliary reservoir, a normally charged supply reservoir, valve means operative by fluid under pressure from said supply reservoir to effect an application of the brakes, a brake application passage through which fluid under pressure is adapted to be supplied to effect either an automatic or a straight air application of the brakes, a straight air pipe through which fluid under pressure is supplied to said passage to effect a straight air application of the brakes, another passage through which fluid under pressure is adapted to be supplied to effect an automatic application of the brakes, a brake controlling valve device subject to the opposing pressures of the brake pipe and auxiliary reservoir and operated upon a reduction in brake pipe pressure for supplying fluid under pressure to said other passage, valve means closing communication between the brake application pipe and said other passage, and a relay release valve device establishing a communication through which fluid under pressure is vented from the auxiliary reservoir to the supply reservoir in effecting a straight air application of the brakes, the flow of fluid from the auxiliary reservoir tending to render the brake controlling valve device less sensitive to unintended fluctuations in brake pipe pressure.

72. In a combined automatic and straight air brake equipment, a normally charged brake pipe, a normally charged auxiliary reservoir, a normally charged supply reservoir, valve means operative by fluid under pressure from said supply reservoir to effect an application of the brakes, a brake application passage through which fluid under pressure is adapted to be supplied to effect either an automatic or a straight air application of the brakes, a straight air pipe through which fluid under pressure is supplied to said passage to effect a straight air application of the brakes, another passage through which fluid under pressure is adapted to be supplied to effect an automatic application of the brakes, a brake controlling valve device subject to the opposing pressures of the brake pipe and auxiliary reservoir and operated upon a reduction in brake pipe pressure for supplying fluid under pressure to said other passage, valve means closing communication between the brake application pipe and said other passage, and a relay release valve device establishing a communication through which fluid under pressure is vented from the auxiliary reservoir to the supply reservoir in effecting a straight air application of the brakes, the flow of fluid from the auxiliary reservoir tending to render the brake controlling valve device less sensitive to unintended fluctuations in brake pipe pressure, said relay valve device being operative in effecting an automatic application of the brakes to close the venting communication.

73. In a combined automatic and straight air brake equipment, in combination, a passage to which fluid under pressure is supplied to effect an application of the brakes and from which fluid under pressure is vented to effect the release of the brakes, a straight air pipe through which fluid under pressure is supplied to said passage in effecting an emergency application of the brakes, a normally charged brake pipe in which the pressure is adapted to be suddenly reduced in effecting an emergency application of the brakes, an auxiliary reservoir, an emergency reservoir, a brake controlling valve device operated upon the sudden reduction in brake pipe pressure to supply fluid under pressure from the auxiliary reservoir and emergency reservoir to said passage, said straight air pipe being vented and said brake pipe being supplied with fluid under pressure to effect the release of the brakes, means included in said brake controlling valve device responsive to the increase in brake pipe pressure for supplying fluid under pressure from the auxiliary reservoir to the brake pipe to accelerate the rate of recharge of the brake pipe, and a check valve preventing flow of fluid under pressure from the auxiliary reservoir to said vented straight air pipe.

74. In a combined automatic and straight air brake equipment, in combination, a brake pipe, a brake cylinder, a supply reservoir, valve means operative by fluid under pressure to supply fluid under pressure from the supply reservoir to the brake cylinder, a passage through which fluid under pressure is adapted to be supplied to said passage, a communication through which fluid under pressure is adapted to flow from the brake pipe to said supply reservoir, a straight air pipe through which fluid under pressure is adapted to be supplied to said passage in effecting a straight air application of the brakes, a brake controlling valve device operative upon a reduction in brake pipe pressure to supply fluid under pressure to said passage in effecting an automatic application of the brakes, and means responsive to the pressure of fluid supplied to said passage for closing said communication.

75. In a combined automatic and straight air brake equipment, in combination, a brake pipe, a brake cylinder, a supply reservoir, valve means operative by fluid under pressure to supply fluid under pressure from the supply reservoir to the brake cylinder, a passage through which fluid under pressure is adapted to be supplied to said passage, a communication through which fluid under pressure is adapted to flow from the brake pipe to said supply reservoir, a straight air pipe through which fluid under pressure is adapted to be supplied to said passage in effecting a straight air application of the brakes, a brake controlling valve device operative upon a reduction in brake pipe pressure to supply fluid under pressure to said passage in effecting an automatic application of the brakes, and means responsive to the pressure of fluid supplied to said passage for closing said communication, and for maintaining the communication closed as long as the pressure of fluid in said passage is in excess of a predetermined low degree.

76. In a combined automatic and straight air brake equipment, in combination, a brake pipe, a brake cylinder, a supply reservoir, valve means operative by fluid under pressure to supply fluid under pressure from the supply reservoir to the brake cylinder, a passage through which fluid under pressure is adapted to be supplied to said passage, a communication through which fluid under pressure is adapted to flow from the brake pipe to said supply reservoir, a straight air pipe through which fluid under pressure is adapted to be supplied to said passage in effecting a straight air application of the brakes, a brake controlling valve device operative upon a reduction in brake pipe pressure to vent fluid under pressure from said communication and thereby effect a quick service reduction in brake pipe pressure and to supply fluid under pressure to said passage in effecting an automatic application of the brakes, and means responsive to a predetermined pressure in said passage for closing said communication.

77. In a combined automatic and straight air brake equipment, in combination, a brake pipe, a passage through which fluid under pressure is adapted to flow to effect an application of the brakes, a straight air pipe through which fluid under pressure is supplied to said passage in effecting a straight air application of the brakes, a brake controlling valve device operative upon a reduction in brake pipe pressure to locally vent fluid under pressure from the brake pipe and to supply fluid under pressure to said passage in effecting an automatic application of the brakes, and means responsive to the pressure of fluid supplied to said passage for closing communication through which fluid under pressure is adapted to be vented from the brake pipe.

78. In a combined automatic and straight air brake equipment, in combination, a brake pipe, a passage through which fluid under pressure is adapted to flow to effect an application of the brakes, a straight air pipe through which fluid under pressure is supplied to said passage in effecting a straight air application of the brakes, a brake controlling valve device operative upon a reduction in brake pipe pressure to locally vent fluid under pressure from the brake pipe and to supply fluid under pressure to said passage in effecting an automatic application of the brakes, and means operative upon a predetermined increase in the pressure of fluid in said passage for closing communication through which fluid under pressure is adapted to be vented from the brake pipe and for maintaining the venting communication closed until in releasing the brakes the pressure of fluid in said passage has been reduced below that required to effect the operation of the means to close the communication.

79. In a combined automatic and straight air brake equipment, in combination, a brake pipe, a communication through which fluid under pressure is supplied in effecting a straight air application of the brakes, means operative upon a reduction in brake pipe pressure to effect the automatic application of the brakes, said means in its operation toward application position being adapted to effect a quick service reduction in brake pipe pressure, and means responsive to the pressure of fluid supplied to said communication for preventing a quick service reduction in brake pipe pressure in the event of accidental movement of the first mentioned means toward application position.

80. In a combined automatic and straight air brake equipment, in combination, a brake pipe, a communication through which fluid under pressure is supplied in effecting a straight air application of the brakes, means operative upon a reduction in brake pipe pressure to effect the automatic application of the brakes, said means in its operation toward application position being adapted to establish a communication through which fluid under pressure is vented from the brake pipe to effect a local quick service reduction in brake pipe pressure, and valve means responsive to the pressure of fluid supplied to the first mentioned communication for closing the second mentioned communication to prevent the venting of fluid under pressure from the brake pipe in the event of accidental movement of the first mentioned means to its quick service communication establishing position.

81. In a combined automatic and straight air brake equipment, in combination, a brake pipe, a communication through which fluid under pressure is supplied in effecting a straight air application of the brakes, means operative upon a reduction in brake pipe pressure to effect the automatic application of the brakes, said means in its operation toward application position being adapted to effect a quick service reduction in brake pipe pressure, and means interposed between the first mentioned means and brake pipe and responsive to the pressure of fluid supplied to said communication for preventing a quick service reduction in brake pipe pressure in the event of accidental movement of the first mentioned means toward application position.

82. In a combined automatic and straight air brake equipment, in combination, a brake pipe, a communication through which fluid under pressure is supplied in effecting a straight air application of the brakes, means operative upon a reduction in brake pipe pressure to effect the automatic application of the brakes, said means in its operation toward application position being adapted to establish a communication through which fluid under pressure is vented from the brake pipe to effect a local quick service reduction in brake pipe pressure, and valve means responsive to the pressure of fluid supplied to the first mentioned communication for closing the second mentioned communication to prevent the venting of fluid under pressure from the brake pipe in the event of accidental movement of the first mentioned means to its quick service communication establishing position, said valve means being adapted to remain in its communication closing position as long as the pressure in the first mentioned communication is in excess of a predetermined low degree.

83. In a fluid pressure brake equipment, in combination, valve means having a release position for establishing a communication through which fluid under pressure may be vented to effect a release of the brakes and having an application position in which said communication is closed and an application of the brakes is effected and having an intermediate position in which said communication is adapted to be closed, a valve device separate from said valve means normally rendering the valve means ineffective to close said communication in said intermediate position and operative upon movement of said valve means to application position to render the valve means effective to close said communication and to render the valve means effective to close said communication upon movement of the valve means to said intermediate position in releasing the brakes.

84. In a fluid pressure brake equipment, in combination, valve means having a release position for establishing a communication through which fluid under pressure may be vented to effect a release of the brakes and having an application position in which said communication is closed and an application of the brakes is effected and having an intermediate position in which said communication is adapted to be closed, a valve device conditioning the valve means to maintain said communication open upon movement of the valve means through the intermediate position in its traverse from release position to application position and operative upon movement of the valve means to application position to condition the valve means to close the communication and to condition the valve means to close the communication upon movement of the valve means to said intermediate position in effecting a subsequent release of the brakes.

85. In a fluid pressure brake equipment, in combination, valve means having a release position for establishing a communication through which fluid under pressure may be vented to effect a release of the brakes and having an application position in which said communication is closed and an application of the brakes is effected and having an intermediate position in which said communication is adapted to be closed, a valve device separate from said valve means normally rendering the valve means ineffective to close said communication in said intermediate position and operative upon movement of said valve means to application position to render the valve means effective to close said communication and to render the valve means effective to close said communication upon movement of the valve means from release position to said intermediate position in effecting a subsequent graduated release of the brakes.

86. In a fluid pressure brake equipment, in combination, valve means having a release position for establishing a communication through which fluid under pressure may be vented to effect a release of the brakes and having an application position in which said communication is closed and an application of the brakes is effected and having an intermediate position in which said communication is adapted to be closed, a valve device conditioning the valve means to maintain said communication open upon movement of the valve means through the intermediate position in its traverse from release position to application position and operative upon movement of the valve means to application position to condition the valve means to close the communication and to condition the valve means to close the communication upon movement of the valve means from release position to said intermediate position in effecting a subsequent graduated release of the brakes.

87. In a fluid pressure brake equipment, in combination, valve means having a release position for establishing a communication through which fluid under pressure may be vented to effect a release of the brakes and having an application position in which said communication is closed and an application of the brakes is effected and having an intermediate position in which said communication is adapted to be closed, a valve device separate from said valve means normally rendering the valve means ineffective to close said communication in said intermediate position and operative upon movement of said valve means to application position to render the valve means effective to close said communication and to render the valve means effective to close said communication upon movement of the valve means from release position to said intermediate position in effecting a subsequent graduated release of the brakes, said valve device being movable to its normal position when the brakes are substantially fully released.

88. In a fluid pressure brake equipment, in combination, valve means having a release position for establishing a communication through which fluid under pressure may be vented to effect a release of the brakes and having an application position in which said communication is closed and an application of the brakes is effected and having an intermediate position in which said communication is adapted to be closed, a valve device conditioning the valve means to maintain said communication open upon movement of the valve means through the intermediate position in its traverse from release position to application position and operative upon movement of the valve means to application position to condition the valve means to close the communication and to condition the valve means to close the communication upon movement of the valve means from release position to said intermediate position in effecting a subsequent graduated release of the brakes, said valve device being movable to its normal position when the brakes are substantially fully released.

89. In a fluid pressure brake equipment, in combination, a brake pipe, a release control valve device having a position for establishing a release communication through which fluid under pressure may flow to effect a release of the brakes and also having a position for closing said communication and being operative alternately to said positions for graduating the release of the brakes, an equalizing valve device having a release position, a release lap position and an application position, said equalizing valve device being operative upon a reduction in brake pipe pressure from release position through release lap position to application position to effect the operation of said release control valve device to close said communication and operative upon a subsequent increase in brake pipe pressure in steps or increments alternately to release position and release lap position to effect the operation of said release control valve device to graduate the release of the brakes, and a valve device normally preventing said release control valve device from operating to close said communication when the equalizing valve device moves outwardly through release lap position in its traverse to application position, and operative after the equalizing valve device has moved outwardly beyond release lap position for rendering the equalizing valve device effective to control the operation of the release control valve device to graduate the release of the brakes upon movement of the equalizing valve device alternately between release and release lap positions.

90. In a fluid prssure brake equipment, in combination, a brake pipe, a brake controlling valve mechanism operated upon a reduction in brake pipe pressure to effect an application of the brakes and operative upon subsequent increases in brake pipe pressure in steps to effect a graduated release of the brakes, said mechanism comprising an equalizing valve device and a release control valve device, and a relay release interlock valve device operative upon movement of the equalizing valve device to application position for conditioning said mechanism for operation to graduate the release of the brakes.

91. In a fluid pressure brake equipment, in combination, a brake pipe, a brake controlling valve mechanism operated upon a reduction in brake pipe pressure to supply fluid under pressure to effect an application of the brakes and operative upon subsequent increases in brake pipe pressure in steps to release fluid under pressure to effect a graduated release of the brakes, said mechanism comprising an equalizing valve device and a release control valve device, and a relay release interlock valve device operative upon a predetermined increase in the pressure of fluid supplied by the brake controlling valve mechanism in effecting an application of the brakes to condition the mechanism for operation to graduate the release of the brakes.

92. In a fluid pressure brake equipment, in combination, a brake pipe, a brake controlling valve mechanism operated upon a reduction in brake pipe pressure to supply fluid under pressure to effect an application of the brakes and operative upon subsequent increases in brake pipe pressure in steps to release fluid under pressure to effect a graduated release of the brakes, said mechanism comprising an equalizing valve device and a release control valve device, and a relay release interlock valve device operative by fluid supplied by said mechanism in effecting an application of the brakes for establishing a control communication for said release control valve device and for also establishing a control communication through which fluid under pressure is adapted to flow to control said equalizing device, and means included in said mechanism operative to control said communications to cause the mechanism to operate to graduate the release of the brakes upon the increases in brake pipe pressure in steps.

93. In a fluid pressure brake equipment, in combination, a brake pipe, a brake controlling valve mechanism operated upon a reduction in brake pipe pressure to supply fluid under pressure to effect an application of the brakes and operative upon subsequent increases in brake pipe pressure in steps to release fluid under pressure to effect a graduated release of the brakes, said mechanism comprising an equalizing valve device and a release control valve device, and a relay release interlock valve device operative by fluid supplied by said mechanism in effecting an application of the brakes for establishing a control communication for said release control valve device and for also establishing a control communication through which fluid under pressure is adapted to flow to control said equalizing valve device, valve means included in said equalizing valve device operative for controlling the first mentioned communication, means included in the release control valve device for controlling the second mentioned communication, and means responsive to the increases in brake pipe pressure in steps for actuating said valve means to effect the operation of the control means of the release control valve device to effect the graduated release of the brakes.

ELLIS E. HEWITT.
DONALD L. McNEAL.